US007918725B2

(12) United States Patent
Baerlocher

(10) Patent No.: US 7,918,725 B2
(45) **Date of Patent: *Apr. 5, 2011**

(54) GAMING DEVICE HAVING SYMBOL REVEALING MECHANISM

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1854 days.

This patent is subject to a terminal disclaimer.

(21) Appl. No.: 10/935,019

(22) Filed: Sep. 7, 2004

(65) Prior Publication Data

US 2005/0059477 A1 Mar. 17, 2005

Related U.S. Application Data

(63) Continuation-in-part of application No. 29/233,595, filed on Jul. 6, 2005, which is a continuation of application No. 29/189,886, filed on Sep. 10, 2003, now Pat. No. Des. 510,752.

(60) Provisional application No. 60/502,363, filed on Sep. 12, 2003.

(51) Int. Cl.
*A63F 13/00* (2006.01)

(52) U.S. Cl. ................................ 463/20; 463/16; 463/21

(58) Field of Classification Search ...................... 463/20
See application file for complete search history.

(56) References Cited

U.S. PATENT DOCUMENTS

| | | | | |
|---|---|---|---|---|
| 1,970,586 | A * | 8/1934 | Wahlberg | 273/142 R |
| 1,978,395 | A | 10/1934 | Groetchen | |
| D164,309 | S | 8/1951 | McManus | |
| D208,030 | S | 7/1967 | Weinard | |
| 3,420,525 | A | 1/1969 | Waders | |
| 3,642,287 | A | 2/1972 | Lally et al. | |
| 3,735,987 | A | 5/1973 | Ohki | |
| D260,769 | S | 9/1981 | Thomas | |
| 4,326,351 | A | 4/1982 | Heywood et al. | |
| 4,410,178 | A | 10/1983 | Partridge | |
| 4,448,419 | A | 5/1984 | Telnaes | |
| 4,517,558 | A | 5/1985 | Davids | |
| 4,695,053 | A | 9/1987 | Vazquez, Jr. et al. | |

(Continued)

FOREIGN PATENT DOCUMENTS

AU 74936/87 6/1987

(Continued)

OTHER PUBLICATIONS

Barn Yard Article in Strictly Slots, published in Mar. 2002.

(Continued)

*Primary Examiner* — Ronald Laneau
*Assistant Examiner* — Justin Myhr
(74) *Attorney, Agent, or Firm* — K&L Gates LLP

(57) ABSTRACT

A gaming device including a housing, a symbol display connected to the housing, and a symbol indicator rotatably connected to the housing which includes at least one section having a viewable area to enable a player to view at least a portion of the symbol display. In one embodiment, after a triggering event associated with a game, the symbol display generates a plurality of first symbols. The symbol indicator moves and positions the viewable area to indicate one or more of the first symbols on the symbol display. The gaming device provides an outcome to the player based on the order of the first symbols indicated on the symbol display. The outcome is based on the position of first symbols indicated on the symbol display.

109 Claims, 23 Drawing Sheets

U.S. PATENT DOCUMENTS

| | | | | |
|---|---|---|---|---|
| 4,756,531 | A | 7/1988 | DiRe et al. | |
| 4,790,537 | A | 12/1988 | Smyth et al. | |
| 4,871,171 | A | 10/1989 | Rivero | |
| 4,978,129 | A | 12/1990 | Komeda et al. | |
| 5,152,529 | A | 10/1992 | Okada | |
| 5,209,479 | A | 5/1993 | Nagao et al. | |
| 5,259,616 | A | 11/1993 | Bergmann | |
| 5,342,049 | A | 8/1994 | Wichinsky et al. | |
| 5,364,100 | A | 11/1994 | Ludlow et al. | |
| 5,393,057 | A | 2/1995 | Marnell, II | |
| 5,393,061 | A | 2/1995 | Manship et al. | |
| 5,395,111 | A | 3/1995 | Inoue | |
| 5,449,173 | A | 9/1995 | Thomas et al. | |
| 5,462,277 | A * | 10/1995 | Takemoto | 463/20 |
| 5,524,888 | A | 6/1996 | Heidel | |
| 5,584,764 | A | 12/1996 | Inoue | |
| 5,609,524 | A | 3/1997 | Inoue | |
| 5,611,535 | A | 3/1997 | Tiberio | |
| 5,647,798 | A | 7/1997 | Falciglia | |
| 5,722,891 | A | 3/1998 | Inoue | |
| 5,752,881 | A | 5/1998 | Inoue | |
| 5,769,716 | A | 6/1998 | Saffari et al. | |
| 5,775,692 | A | 7/1998 | Watts et al. | |
| 5,788,573 | A | 8/1998 | Baerlocher et al. | |
| 5,823,874 | A | 10/1998 | Adams | |
| D400,597 | S | 11/1998 | Hedrick et al. | |
| 5,833,537 | A | 11/1998 | Barrie | |
| 5,848,932 | A | 12/1998 | Adams | |
| 5,851,148 | A | 12/1998 | Brune et al. | |
| D404,084 | S | 1/1999 | Hedrick et al. | |
| 5,863,249 | A | 1/1999 | Inoue | |
| D406,615 | S | 3/1999 | Griswold et al. | |
| 5,882,261 | A | 3/1999 | Adams | |
| 5,890,962 | A | 4/1999 | Takemoto | |
| 5,919,088 | A | 7/1999 | Weiss | |
| 5,934,672 | A | 8/1999 | Sines et al. | |
| 5,935,002 | A | 8/1999 | Falciglia | |
| 5,947,820 | A | 9/1999 | Morro et al. | |
| 5,984,782 | A | 11/1999 | Inoue | |
| 5,997,401 | A | 12/1999 | Crawford | |
| 6,003,867 | A | 12/1999 | Rodesch et al. | |
| 6,027,115 | A | 2/2000 | Griswold et al. | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,086,066 | A | 7/2000 | Takeuchi et al. | |
| 6,089,976 | A | 7/2000 | Schneider et al. | |
| 6,089,978 | A | 7/2000 | Adams | |
| 6,095,921 | A | 8/2000 | Walker et al. | |
| 6,102,798 | A | 8/2000 | Bennett | |
| 6,120,378 | A | 9/2000 | Moody | |
| 6,135,884 | A | 10/2000 | Hedrick et al. | |
| 6,142,873 | A | 11/2000 | Weiss et al. | |
| 6,162,121 | A | 12/2000 | Morro et al. | |
| 6,165,070 | A | 12/2000 | Nolte et al. | |
| 6,168,520 | B1 | 1/2001 | Baerlocher et al. | |
| 6,174,234 | B1 | 1/2001 | Seibert et al. | |
| 6,174,235 | B1 | 1/2001 | Walker et al. | |
| 6,190,254 | B1 | 2/2001 | Bennett | |
| 6,210,279 | B1 | 4/2001 | Dickinson | |
| 6,213,876 | B1 | 4/2001 | Moore, Jr. | |
| 6,220,959 | B1 | 4/2001 | Holmes, Jr. et al. | |
| 6,224,483 | B1 | 5/2001 | Mayeroff | |
| 6,261,177 | B1 | 7/2001 | Bennett | |
| 6,270,411 | B1 | 8/2001 | Gura et al. | |
| 6,270,412 | B1 | 8/2001 | Crawford et al. | |
| 6,302,790 | B1 | 10/2001 | Brossard | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,319,124 | B1 | 11/2001 | Baerlocher | |
| 6,328,649 | B1 | 12/2001 | Randall et al. | |
| 6,334,814 | B1 | 1/2002 | Adams | |
| 6,347,996 | B1 | 2/2002 | Gilmore et al. | |
| 6,364,766 | B1 | 4/2002 | Anderson et al. | |
| 6,398,218 | B1 | 6/2002 | Vancura | |
| 6,398,220 | B1 | 6/2002 | Inoue | |
| 6,435,511 | B1 | 8/2002 | Vancura et al. | |
| 6,439,993 | B1 | 8/2002 | O'Halloran | |
| 6,439,995 | B1 | 8/2002 | Hughs-Baird et al. | |
| 6,461,241 | B1 | 10/2002 | Webb et al. | |
| 6,471,208 | B2 | 10/2002 | Yoseloff et al. | |
| 6,551,187 | B1 | 4/2003 | Jaffe | |
| 6,561,900 | B1 | 5/2003 | Baerlocher et al. | |
| 6,569,015 | B1 | 5/2003 | Baerlocher et al. | |
| 6,575,830 | B2 | 6/2003 | Baerlocher et al. | |
| 6,589,114 | B2 | 7/2003 | Rose | |
| 6,595,854 | B2 | 7/2003 | Hughs-Baird et al. | |
| 6,616,142 | B2 | 9/2003 | Adams | |
| 6,659,864 | B2 | 12/2003 | McGahn et al. | |
| D487,582 | S | 3/2004 | McGahn et al. | |
| 6,715,756 | B2 | 4/2004 | Inoue | |
| 6,726,204 | B2 | 4/2004 | Inoue | |
| D496,968 | S | 10/2004 | Baerlocher | |
| 6,854,732 | B2 | 2/2005 | Moody | |
| 6,857,958 | B2 | 2/2005 | Osawa | |
| 6,866,583 | B2 | 3/2005 | Glavich et al. | |
| D504,473 | S | 4/2005 | Baerlocher | |
| 6,905,406 | B2 | 6/2005 | Kaminkow et al. | |
| 7,217,189 | B2 | 5/2007 | Kaminkow | |
| 7,402,102 | B2 | 7/2008 | Marks et al. | |
| 7,591,724 | B2 | 9/2009 | Baerlocher | |
| 2002/0094857 | A1 | 7/2002 | Meyer | |
| 2002/0094862 | A1 | 7/2002 | Inoue | |
| 2002/0142829 | A1 | 10/2002 | Inoue | |
| 2003/0027622 | A1 | 2/2003 | Osawa | |
| 2003/0040355 | A1 | 2/2003 | Baerlocher | |
| 2003/0232643 | A1 | 12/2003 | Inoue | |
| 2004/0000754 | A1 | 1/2004 | Inoue | |
| 2004/0009803 | A1 | 1/2004 | Bennett et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0023714 | A1 | 2/2004 | Asdale | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0053658 | A1 | 3/2004 | Rothranz | |
| 2004/0058727 | A1 | 3/2004 | Marks et al. | |
| 2004/0121840 | A1 | 6/2004 | Rosander et al. | |
| 2005/0059486 | A1 | 3/2005 | Kaminkow | |
| 2005/0277460 | A1 | 12/2005 | Inoue | |
| 2006/0019738 | A1 | 1/2006 | Baerlocher et al. | |
| 2006/0046830 | A1 | 3/2006 | Webb | |
| 2006/0084492 | A1 | 4/2006 | Baerlocher et al. | |

FOREIGN PATENT DOCUMENTS

| | | | |
|---|---|---|---|
| AU | 199716432 | B2 | 9/1997 |
| AU | 199717601 | | 9/1997 |
| AU | A-50327/96 | | 10/1997 |
| DE | 31 05 266 | | 9/1982 |
| DE | 3700861 | A1 | 7/1988 |
| EP | 0 060 019 | | 9/1982 |
| EP | 0 410 789 | | 7/1990 |
| EP | 0 798 676 | A1 | 10/1997 |
| EP | 0926645 | A2 | 6/1999 |
| EP | 0 945 837 | A2 | 9/1999 |
| EP | 0944030 | A2 | 9/1999 |
| EP | 0 984 408 | | 3/2000 |
| GB | 1 464 896 | A | 1/1974 |
| GB | 2 083 936 | A | 3/1982 |
| GB | 2 0 96 376 | A | 10/1982 |
| GB | 2 097 160 | A | 10/1982 |
| GB | 2 106 292 | A | 4/1983 |
| GB | 2 117 155 | A | 10/1983 |
| GB | 2 170 636 | A | 8/1986 |
| GB | 2 183 882 | A | 6/1987 |
| GB | 2 226 436 | A | 6/1990 |
| GB | 2 328 311 | A | 2/1999 |
| WO | WO 00/59591 | | 10/2000 |
| WO | WO 00/66235 | | 11/2000 |
| WO | WO 00/76606 | | 12/2000 |

OTHER PUBLICATIONS

Barn Yard Advertisement written by Aristocrat, not dated.
Bonus Times Article written by Strictly Slots, published in Jul. 2000.
Take Your Pick Advertisement written by IGT/Anchor Gaming, published in 1999, on or before December thereof.
Take Your Pick Article, Strictly Slots, published Mar. 2001.
Vision Series™/Good Times™ Brochure written by IGT, published in 1999, on or before Decenber thereof.
X Factor Brochure and Website Page written by WMS Gaming, Inc., published in 1998, on or before December thereof.
Enchanted Unicorn advertisement, written by IGT, published in 2001.
Penguin Pays advertisement, written by Aristocrat, published in 1998.
REEL MAGIC Gaming Machine description, written by IGT, available in 1986.
Wild Streak advertisement, written by WMS Gaming, Inc., available prior to Sep. 7, 2004.
Wild Streak article, written by Strictly Slots, published in Mar. 2001.
Marshall Fey, Slot Machines a pictorial History of the First 100 Years, 1983, Liberty Belle Books, pp. 79, 150, 171, 231.
Easy Street Advertisements and Articles written by Casino Data Systems, published in 2000.
Treasure Wheel/Treasure Tunnel Advertisement written by Sigma Game, Inc., published prior to 2000.
Wheel of Fortune Advertisement written by IGT, published in 1998.
Wheel of Fortune Article written by IGT, published in 1999.
Austin Powers in Goldmember™ Advertisement written by IGT, published in 2003.
Magic 8 Ball Advertisement written by IGT, published in 2002.

* cited by examiner

GAMING DEVICE HAVING SYMBOL REVEALING MECHANISM

PRIORITY CLAIM

This application is a continuation-in-part application of, claims priority to and the benefit of U.S. Provisional Patent Application Ser. No. 60/502,363, filed on Sep. 12, 2003, and U.S. Design patent application Ser. No. 29/233,595, filed on Jul. 6, 2005, which is a continuation application of, claims priority to and the benefit of U.S. Design patent application Ser. No. 29/189,886, filed on Sep. 10, 2003, now U.S. Pat. No. D 510,752, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Another way to enhance a player's enjoyment, entertainment and excitement with a gaming device is by including lights, sounds and other visual or audio or audio-visual effects in the gaming machines.

Certain known gaming devices use mechanical devices such as reels, wheels or spheres to enhance the attraction of the machines to players and also to enhance the player's game playing experience. These mechanical devices enable a player to see physical movements of symbols or functional elements of a game, a portion of a game which increases the player's enjoyment of the game.

To increase player enjoyment and excitement, it is desirable to provide new and different mechanical devices which operate in conjunction with primary or secondary games of wagering gaming devices.

SUMMARY OF THE INVENTION

The present invention is directed to a gaming device having a mechanical display such as a mechanical topper unit having a symbol revealing mechanism including a housing, a symbol display connected to the housing which is adapted to generate and display at least one symbol from a plurality of symbols, and a movable symbol indicator having at least one section including a viewable area which is positionable to reveal one or more of the symbols of the symbol display.

In one embodiment, after a triggering event in or associated with a game, the symbol display displays a plurality of first symbols which are generated by the symbol display and the symbol indicator moves or rotates relative to the symbol display to position the section including the viewable area to reveal a designated number of the first symbols generated by the symbol display. The gaming device provides an award to a player based on the first symbols of the symbol display which are revealed by or visible through the viewable area.

In one embodiment, the outcome or award is based on the order of the first symbols revealed or indicated by the viewable area of the symbol indicator. For example, if the first symbols include values or numbers, and the viewable area reveals the numbers 4 and 8 (in this order) the gaming device provides an award of forty-eight to the player. Therefore, the positioning of the viewable area or window determines in part the amount or value of the award or outcome provided to the player in a game. By revealing or indicating one or more of the first symbols on the symbol display using the viewable area or window of the symbol indicator, the present invention increases the excitement and enjoyment of the game for the player because the player does not know the value or amount the outcome or award until the viewable area is positioned in the game.

In one embodiment, the symbol display generates the first symbols before the symbol indicator moves to position the viewable area to reveal the designated number of the first symbols generated by the symbol display. In another embodiment, the symbol indicator moves and positions the viewable area before the symbol display generates any first symbols. In this embodiment, the symbol display generates one or more first symbols after the viewable area is positioned to reveal at least a portion of the symbol display.

In one embodiment, the symbol indicator includes a plurality of sections where at least one of the sections includes the viewable area or window described above and at least one of the other sections includes at least one second symbol which may be the same or different from any of the first symbols on the symbol display. The second symbols may represent values, awards, free spins, free games, game elements or any other suitable outcome or award which may be added to or used in combination with the first symbols indicated on the symbol display to determine the outcome or award provided to the player in the game.

In one embodiment, the gaming device includes a section indicator which indicates one of the sections on the symbol indicator after the symbol indicator is moved or rotated in a game. When the section indicator indicates the section including the viewable area or window, the gaming device provides an award to the player based on any of the first symbols generated by the symbol display which are revealed by the viewable area. If the section indicator indicates one of the sections including at least one of the second symbols, the gaming device provides an outcome or award associated with the indicated second symbol. It should be appreciated that the gaming device may include one or more section indicators in a game.

In one embodiment, a symbol indicator includes a plurality of sections where at least two of the sections include a viewable area separated by a modifier. The modifier may be any suitable modifier such as a multiplication symbol, an addition symbol, a subtraction symbol, a division symbol or any other suitable modifier. Upon a triggering event associated with the game, the symbol indicator moves or rotates to reveal one or more first symbols in one or both of the viewable areas on the symbol indicator. If the symbol indicator moves and positions the viewable areas such that only one of the viewable areas reveals a portion or all of the symbol display, the gaming device provides an outcome based on the first symbols visible through or indicated by the symbol display in that viewable area. If the symbol indicator moves and positions the viewable areas such that at least one first symbol is visible through each of the viewable areas (i.e., on each side of the modifier), the gaming device uses the modifier to modify the first symbols which are visible or viewable through each of the viewable areas. For example, if the first symbols are numbers and a number five is visible through the first viewable area and a number nine is visible through the second viewable area and the viewable areas are separated by a section including a modifier, such as a multiplication symbol, the gaming device provides an outcome to the player which is the number five multiplied by the number nine or forty-five. By including additional viewable areas or windows and a modifier to modify one or more first symbols visible through each of those viewable areas, the gaming device increases the player's excitement and enjoyment of the game.

In another embodiment, the symbol indicator includes a plurality sections where at least one of the sections includes a plurality of viewable areas. In this embodiment, when the section including the plurality of viewable areas is indicated by the section indicator, the first symbols visible through the viewable areas on the indicated section are combined to form the award provided to the player. In one aspect of this embodiment, a modifier such as a multiplier separates the viewable areas and modifies any outcome or award associated with the symbols visible through the viewable areas. In another embodiment, different sized viewable areas are included on one or more of the sections of the symbol indicator to display a plurality of the first symbols of the symbol display. For example, if the symbol display includes a plurality of reels, the viewable areas may be sized to display one, a plurality or all of the symbols displayed of the first symbols displayed by one of the reels of the symbols display. It should be appreciated that the viewable areas may be any suitable size or shape to display one or more of the first symbols of the symbol display.

In another embodiment, the symbol display includes a video display device which simulates mechanical components of the gaming device such as mechanical reels or wheels in a game. In this embodiment, the video display device or symbol display generates one or more first symbols as described above. It should be appreciated that the symbol display may be a mechanical display, a video display or any suitable display device.

The present invention may be employed in a primary or base game, a secondary or bonus game or in any suitable game associated with a gaming device.

An advantage of the present invention is to provide a gaming device including a symbol revealing mechanism which reveals one or more symbols generated by a symbol display to determine an award based on the revealed symbols.

Another advantage of the present invention is to provide a gaming device including a symbol revealing mechanism which reveals one or more symbols generated by a symbol display to determine an award based on the order of the revealed symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
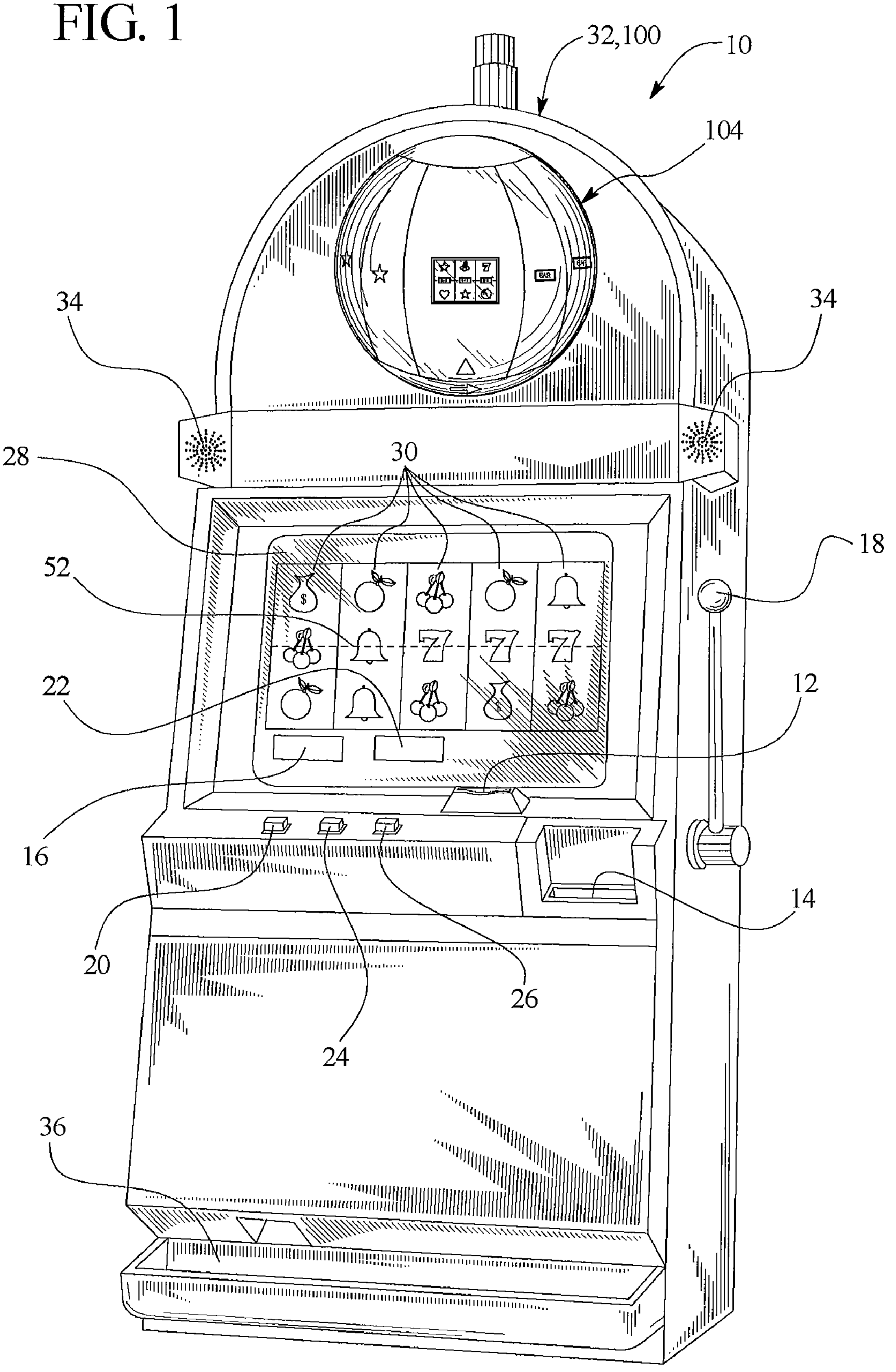
FIG. 1 is a front elevational view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. In the embodiment illustrated in FIGS. 3 to 11, the gaming device 10 can be constructed as a pub-style table-top game (not shown) that a player can operate preferably while sitting. Gaming device 10 can incorporate any game such as slot, poker or keno. The symbols used on and in gaming device 10 may be in mechanical, electrical or in video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. The present invention preferably employs or uses credits, however, the present invention is not limited to the use of credits and contemplates employing other units of value such as money. For purposes of describing and claiming this invention, the term “credit” includes any unit of value such as a gaming device credit or actual money.

After depositing the appropriate amount of money, a player can begin the game by pulling arm 18 or by pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which contains a plurality of reels 30, preferably three to five reels in mechanical or video form. Each reel 30 displays a plurality of symbols such as bells, hearts, martinis, fruits, cactuses, numbers, cigars, letters, bars or other images, which preferably correspond to a theme associated with the gaming device 10. If the reels 30 are in video form, the gaming device 10 preferably displays the video reels 30 in a display device described below. Furthermore, gaming device 10 preferably includes speakers 34 for making sounds or playing music.

A player may “cash out” and thereby receive a number of coins corresponding to the number of remaining credits by pushing a cash out button 26. When the player “cashes out,” the player receives the coins in a coin payout tray 36. The gaming device 10 may employ other payout mechanisms such as credit slips redeemable by a cashier or electronically recordable cards that keep track of the player’s credits.

With respect to electronics, the controller of gaming device 10 preferably includes the electronic configuration generally illustrated in FIG. 2, which has: a processor 38; a memory device 40 for storing program code or other data; a display device 32 (i.e., a liquid crystal display) described below; a plurality of speakers 34; at least one input device as indicated by block 33 and mechanical devices such as a symbol indicator 102 and a symbol display 106, which are further described below. The processor 38 is preferably a microprocessor or microcontroller-based platform that is capable of displaying images, symbols and other indicia such as images of people, characters, places, things and faces of cards. The memory device 40 can include random access memory (RAM) (not shown) for storing event data or other data generated or used during a particular game. The memory device 40 can also include read only memory (ROM) (not shown) for storing program code, which controls the gaming device 10 so that it plays a particular game in accordance with applicable game rules and paytables.

Figure 2:
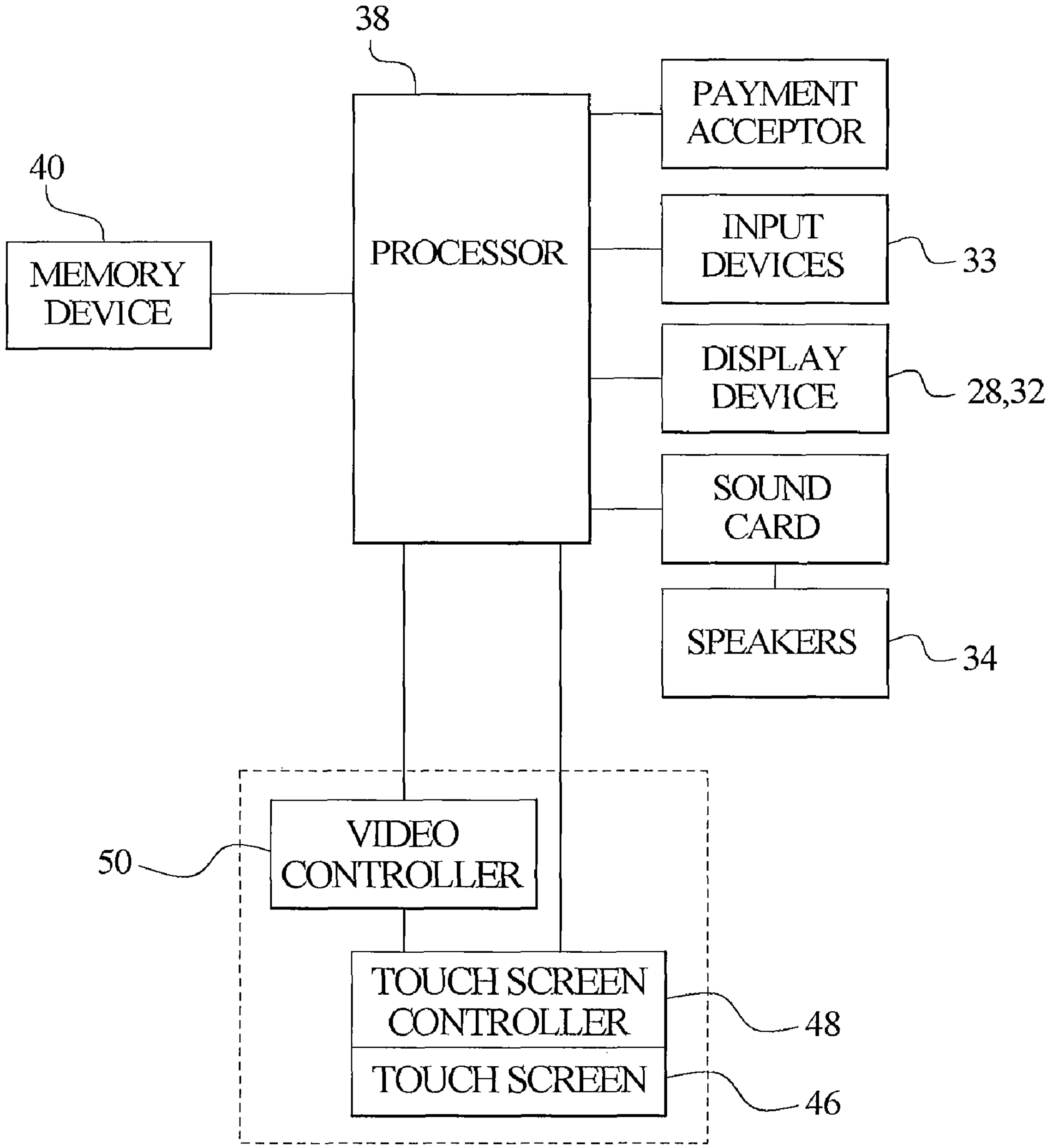
FIG. 2 is a schematic block diagram of the electronic configuration of one embodiment of the gaming device of the present invention.

As illustrated in FIG. 2, the player preferably uses the input devices 33, such as the arm 18, play button 20, the bet one button 24 and the cash out button 26 to input signals into gaming device 10. In certain instances, a touch screen 46 and an associated touch screen controller 48 can be used in conjunction with a display device described in detail below. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC’s) or other hard-wired devices, or using mechanical devices (collectively or alternatively referred to herein as a “processor”). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus round. This type of gaming device 10 will include a program that will automatically begin a bonus round when the player has achieved a qualifying condition in the game. This qualifying condition can be a particular arrangement of indicia on the display window 28. The gaming device 10 also includes a display device such as a display device 32 shown in FIG. 1 enabling the player to play the bonus round. The display device 32 can be any known video monitor, television screen, dot matrix display, CRT, LED, LCD or electro-luminescent display. The display device 32 can be color or monochrome although, preferably, the display is color. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Symbol Revealing Mechanism

Figure 3:
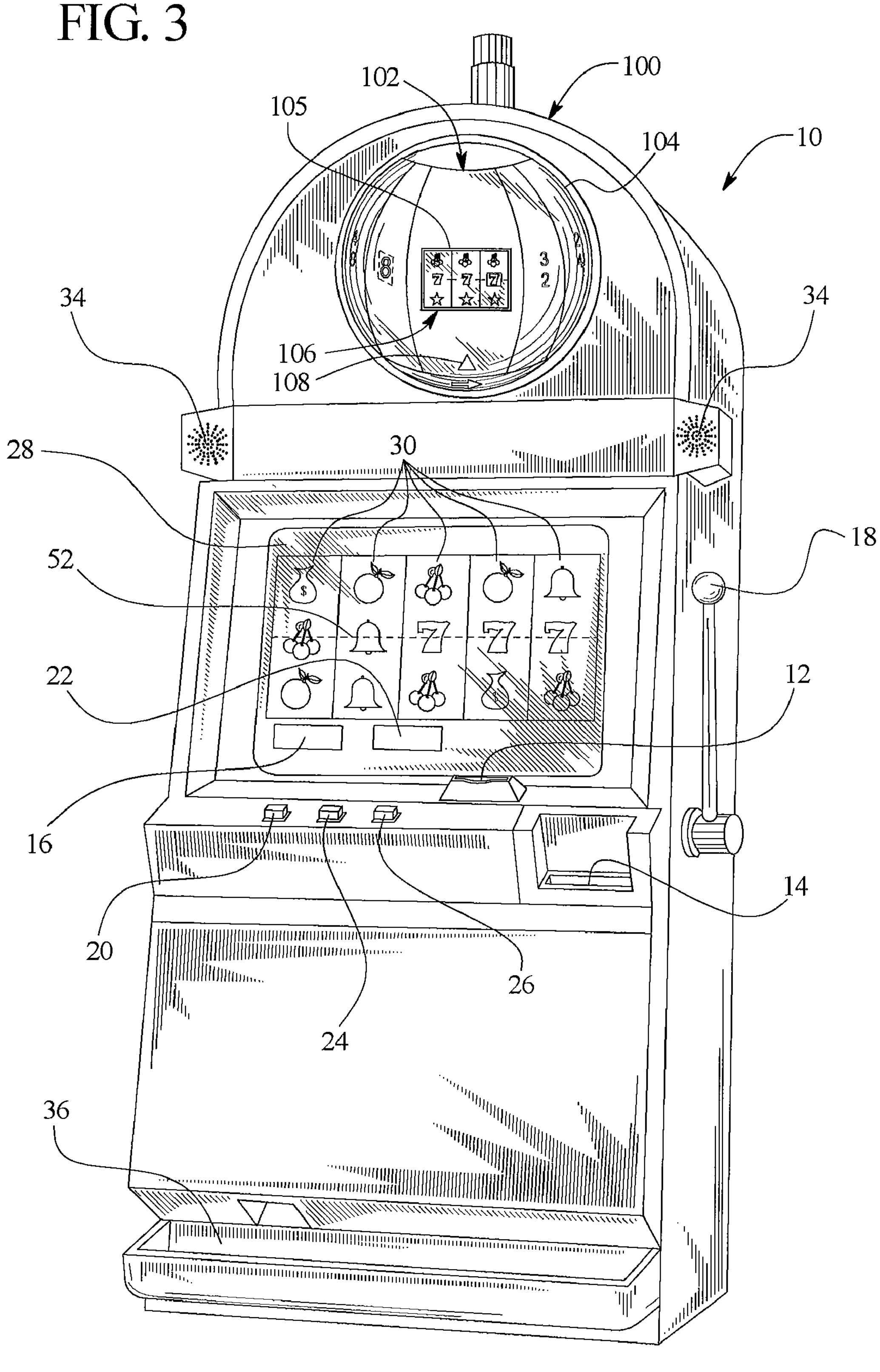
FIG. 3 is an enlarged elevation view of an alternative embodiment of the display device of the present invention illustrating a movable symbol indicator including a section having a viewable area which enables a player to view a symbol display which generates and displays at least one first symbol and at least one section including a second symbol.
Figure 4:
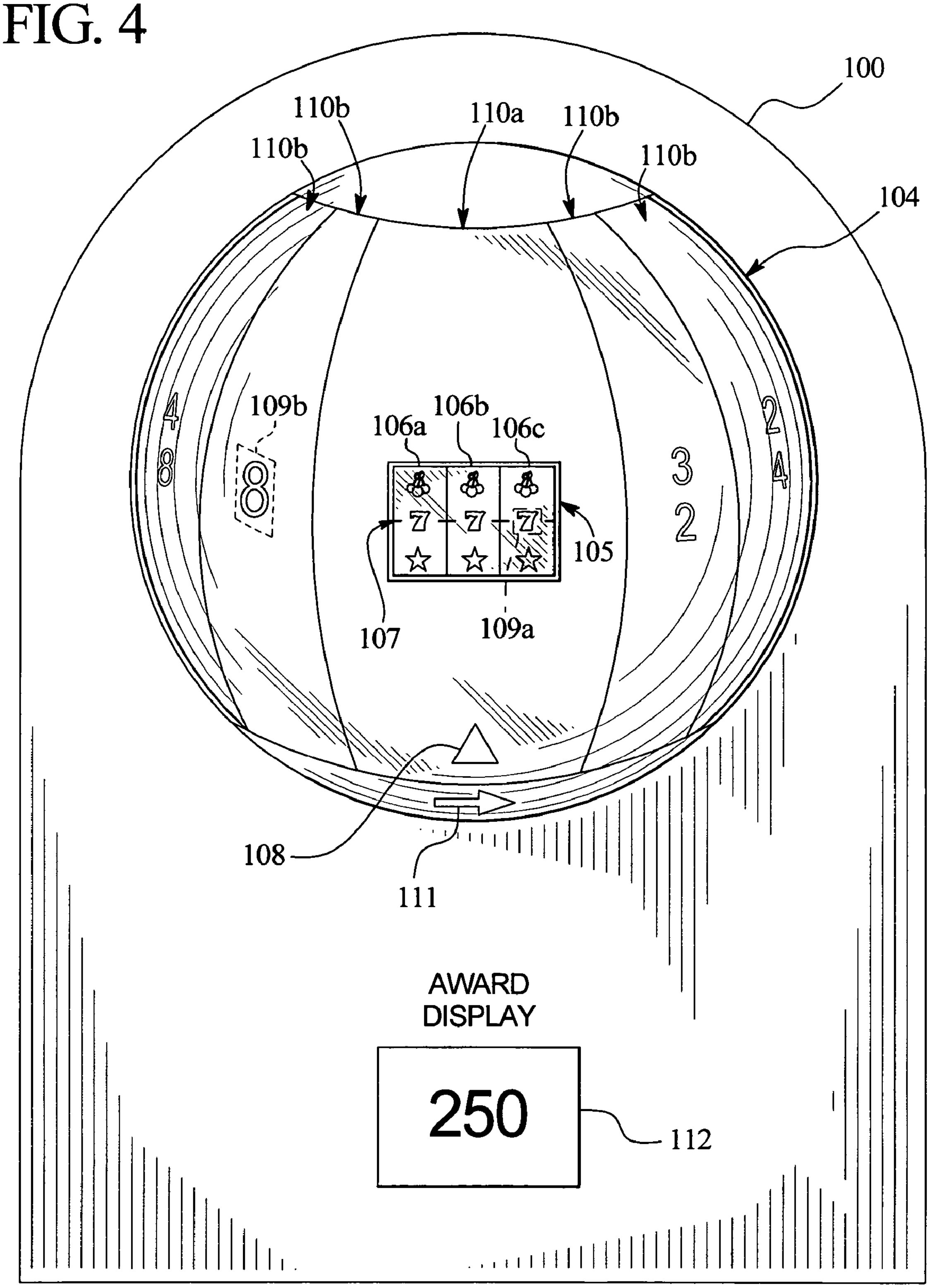
FIG. 4 is an enlarged elevation view of the alternative embodiment of FIG. 3 illustrating the section indicator indicating the section including the viewable area.
Figure 5:
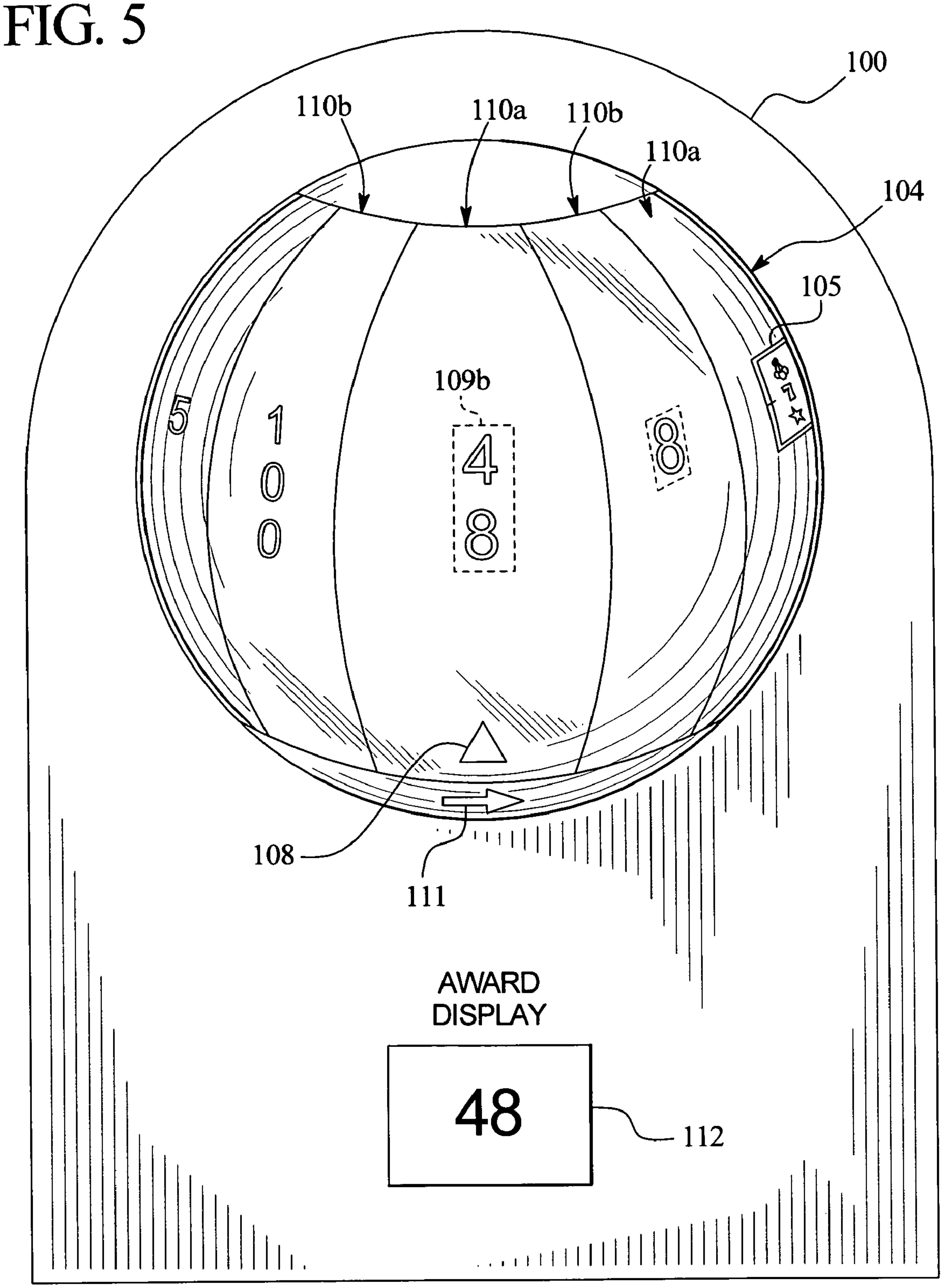
FIG. 5 is an enlarged elevation view of the alternative embodiment of FIG. 3 illustrating the section indicator indicating one of the sections including a second symbol.

Referring now to FIGS. 3, 4 and 5, one embodiment of the display device of the present invention is illustrated where the display device such as the mechanical display device 100 includes a symbol display 106 such as a plurality of reels 106*a*, 106*b* and 106*c* which generate and display a plurality of first symbols such as the symbols 109*a* and a movable symbol indicator 102. In one embodiment, the movable symbol indicator 102 includes a plurality of sections where at least one of the sections includes a section 110*a* having a viewable area or window 105 which enables a player to view or see the symbol display or reels and in particular a designated number of symbols of the symbol display or reels. Additionally, in one embodiment, the sections include at least one section 110*b* having at least one second symbol 109*b*. In one embodiment, the gaming device further includes a section indicator which is mounted to the housing 108 which indicates one of the sections of the symbol indicator 102 in one or more activations of the symbol indicator.

In one embodiment, upon a triggering event in a game, the symbol display includes a plurality of reels 106*a*, 106*b* and 106*c* which are operable to generate and display a plurality of the first symbols 109*a* such as the cherry symbol, the star symbol, the bar symbol, the orange symbol and the seven symbol. The gaming device moves or rotates the symbol indicator 102 in the direction of arrow 111. The symbol indicator stops moving or rotating and the section indicator 108 indicates one of the sections 110*a* or 110*b* of the symbol indicator. The gaming device provides an outcome such as an award based on one or more of the first symbols 109*a* when the section indicator 108 indicates the section 110*a* including the viewable area 105. Specifically, in one embodiment, as shown in FIG. 4, the gaming device provides the player with an award based on any first symbols 109*a* occurring on a payline 107 associated with any of the reels 106*a*, 106*b* and 106*c* which are visible or viewable in the viewable area 105. For example, as shown in FIG. 3, if all three of the reels 106*a*, 106*b* and 106*c* are visible or viewable in area 105 then the gaming device provides an award, if any, to the player based on the first symbols 109*a* which occur on the payline 107 such as the three seven symbols. The gaming device provides the award associated with any winning symbol combinations occurring on payline 107 associated with the reels. For example in FIG. 4, three seven symbols provides an award of two hundred fifty as indicated by award display 112. It should be appreciated that the award may be based on any winning symbol combinations occurring on the reels including one or more of the paylines associate with the reels.

In the embodiment described above, the symbol display or reels 106*a*, 106*b* and 106*c* are activated or move before the symbol indicator moves to indicate one or more of the first symbols or the second symbols in a game. In another embodiment, the symbol indicator moves or rotates before the reels 106*a*, 106*b* and 106*c* are activated or move. For example, the symbol indicator initially rotates upon a triggering event in the game. It should be appreciated that the symbol display and/or the symbol indicator may move in any suitable direction or directions. If the section indicator indicates the section of the symbol indicator including the viewable area 105 (i.e., the symbol display or reels 106*a*, 106*b* and 106*c* are indicated by the section 110*a* including the viewable area 105), the reels are activated to display one or more of the first symbols on the reels. The gaming device then provides an award to the player based on the first symbols occurring on the reels. It should be appreciated that the symbol display and the symbol indicator may each be activated or moved for one activations, a plurality of activations or any suitable number of activations in a game or games.

Referring to FIG. 5, in one embodiment, when the section indicator 108 indicates one of the sections 110*b* on the symbol display 102, the gaming device provides an award to the player based on the second symbol or symbols 109*b* included on the indicated section. For example, if the section indicator indicates a section 113 including a second symbol 109*b* as shown in FIG. 5, the gaming device provides the player with an award associated with the indicated second symbol, which is forty-eight. It should be appreciated that the first and second symbols may be values, awards, modifiers, free games, free spins of the reels or any other suitable outcome. The present invention therefore increases a player's excitement and enjoyment by providing multiple moving components which determine the outcome or award provided to the player in the game.

In one embodiment, the mechanical display device includes a housing 100 which is connected to the top of the cabinet of the gaming device 10. In another embodiment, the mechanical display is separate from the gaming device and is in communication with the processor. In this embodiment, the mechanical display is positioned to be viewable by a player.

The symbol display may be any suitable symbol display, such as the plurality of reels 106*a*, 106*b* and 106*c*, that generates and displays a plurality of first symbols to a player. It should be appreciated that the first symbols may represent values, awards, free spins, free games, game elements or any other suitable outcomes. In one embodiment, the symbol display or reels include mechanical reels. In another embodiment, the symbol display includes video reels displayed on a video display device. In the embodiment including the video reels, the video reels are displayed on a video display device which is connected to the cabinet of the gaming device. In another embodiment, the video reels are connected to a movable housing (not shown) where the housing and video reels may move in the same direction or in a different direction from the movable symbol indicator. It should be appreciated that the symbol display may be a plurality of reels, a wheel, a plurality of wheels or any other suitable symbol display.

In one embodiment, the symbol indicator 102 includes a sphere or ball which is positioned in a corresponding opening 104 in the housing 100 and is rotatably connected to the housing. It should be appreciated that the symbol display may be any suitable size or shape. In one embodiment, the symbol indicator moves or rotates generally from the left to the right as indicated by arrow 111. It should be appreciated that the symbol indicator may move from the left to the right, from the right to the left or in any suitable direction or combination of directions. The symbol indicator 102 includes a plurality of sections where at least one of the sections includes a viewable area or window 105. In one embodiment, the viewable area 105 includes an opening which corresponds to the shape and/or size of the symbol display such as the reels 106*a*, 106*b* and 106*c* as shown in FIG. 3. In another embodiment, the viewable area 105 includes a substantially transparent material that enables a player to view or see the symbol display. In one embodiment, at least one of the sections also includes at least one second symbol 109*b*. The second symbol 109*b* may represent at least one value, award, free spin, free game, game element or any other suitable outcome.

In one embodiment, the gaming device includes a section indicator 108 which indicates one or more of the sections on the symbol indicator. The section indicator 108 may be an arrow or pointer as illustrated in FIGS. 3, 4 and 5, or any other suitable indicator. It should be appreciated that the display device may include one or a plurality of section indicators. It should also be appreciated that the section indicator may be any suitable size or shape.

Figure 6:
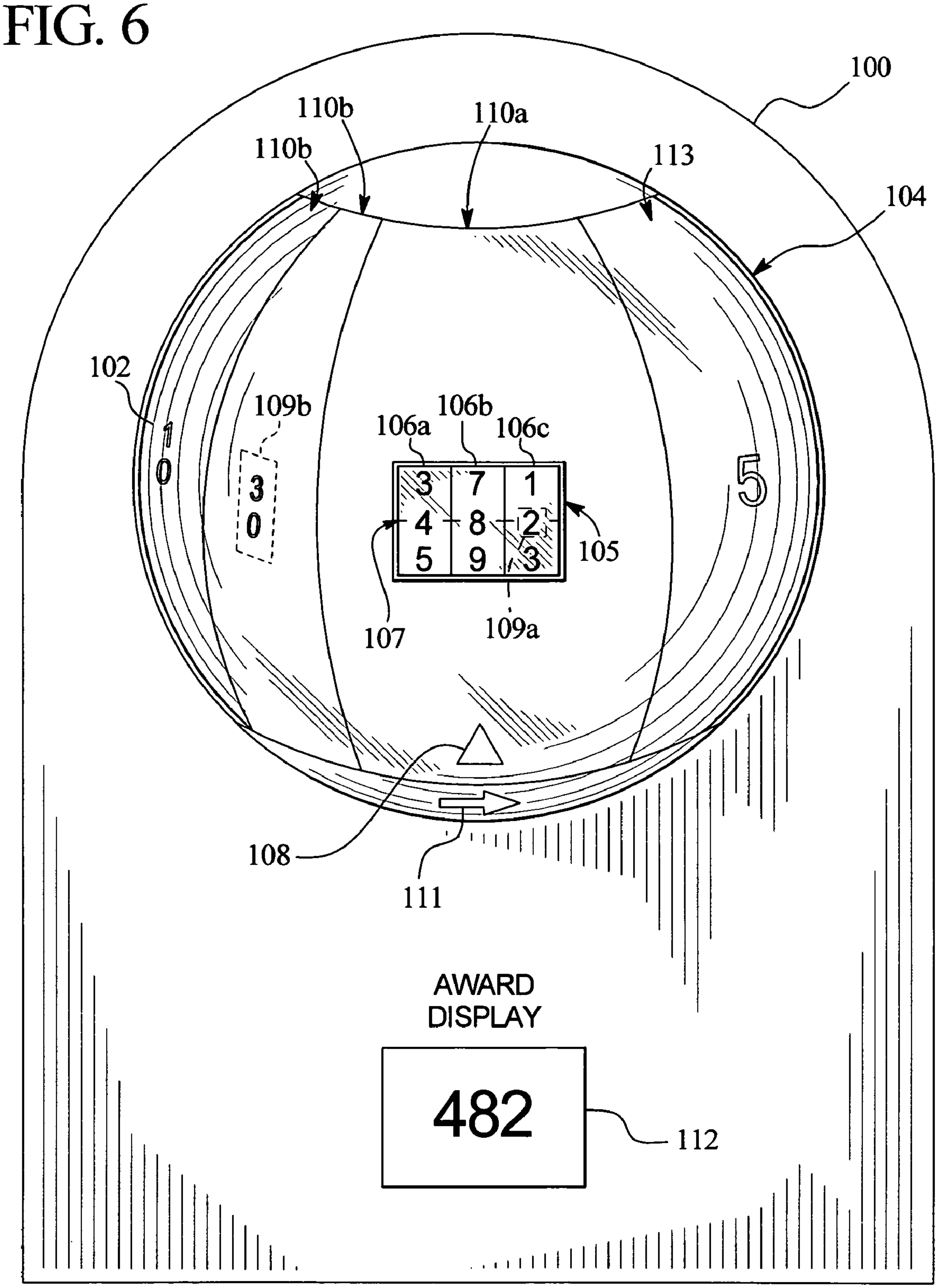
FIG. 6 is an enlarged elevation view of another alternative embodiment of the display device of the present invention illustrating a movable symbol indicator including a section having a viewable area which enables a player to view a symbol display which generates and displays a plurality of first symbols representing numbers and at least one section including a second symbol representing an award.

Referring now to FIG. 6, in an alternative embodiment, the first symbols 109*a* represent numbers or numerals. In this embodiment, upon a triggering event in a game, the plurality of reels 106*a*, 106*b* and 106*c* generate and display a plurality of the first symbols or numerals 109*a* to a player. The gaming device then moves or rotates the symbol display 102 in the direction of arrow 111. The symbol display stops moving or rotating and the section indicator 108 indicates one of the sections 110*a* or 110*b*. The gaming device provides an award based on one or more of the numerals when the section indicator 108 indicates the section 110*a* including the viewable area 105.

Specifically, as shown in FIG. 6, the gaming device provides the player with an award based on any first symbols or numerals 109*a* occurring on a payline 107 associated with the reels 106*a*, 106*b* and 106*c* which are visible or viewable in the viewable area 105. For example, as shown in FIG. 6, if all three of the reels 106*a*, 106*b* and 106*c* are visible or viewable in area 105 then the gaming device provides an award to the player based on the first symbols 109*a* such as numerals 4, 8 and 2 occurring on payline 107. In one embodiment, the gaming device provides an award equal to the value determined by the order of the numerals on payline 107, which in the illustrated embodiment, is four hundred eighty-two as indicated by award display 112. It should be appreciated that the award may be determined based on any combination of the viewable first symbols such as summing the first symbols occurring on payline 107, multiplying the first symbols occurring on payline 107 or combining the first symbols in any suitable manner. It should also be appreciated that the award may be determined using any of the symbols indicated on the symbol display. For example in FIG. 6, the award may be based on symbols 3, 4 and 5 occurring on reel 106*a* or any other suitable combination of the symbols on the symbol display.

If the gaming device positions the viewable area 105 of section 110*a* so that less than all of the reels 106*a*, 106*b* and 106*c* are viewable by a player in the viewable area 105, the gaming device provides an award to the player based only on the first symbols occurring on payline 107 which are viewable or visible to the player in viewable area 105. For example in FIG. 6, if only reels 106*a* and 106*b* are visible or viewable in the viewable area 105 of section 11o*a* after the symbol indicator 102 stops rotating, the gaming device provides an award to the player based on the first symbols occurring on payline 107 associated with reels 106*a* and 106*b* displayed or indicated in the viewable area 105. In this example, the award includes the first symbols or numerals 4 and 8, or have a value of forty-eight. As described above, it should be appreciated that the award provided to the player may be based on any of the first symbols occurring on the reels 106*a*, 106*b* and 106*c* which are viewable or visible in the viewable area 105 after one or more activations or spins of the symbol indicator 102.

Figure 7A:
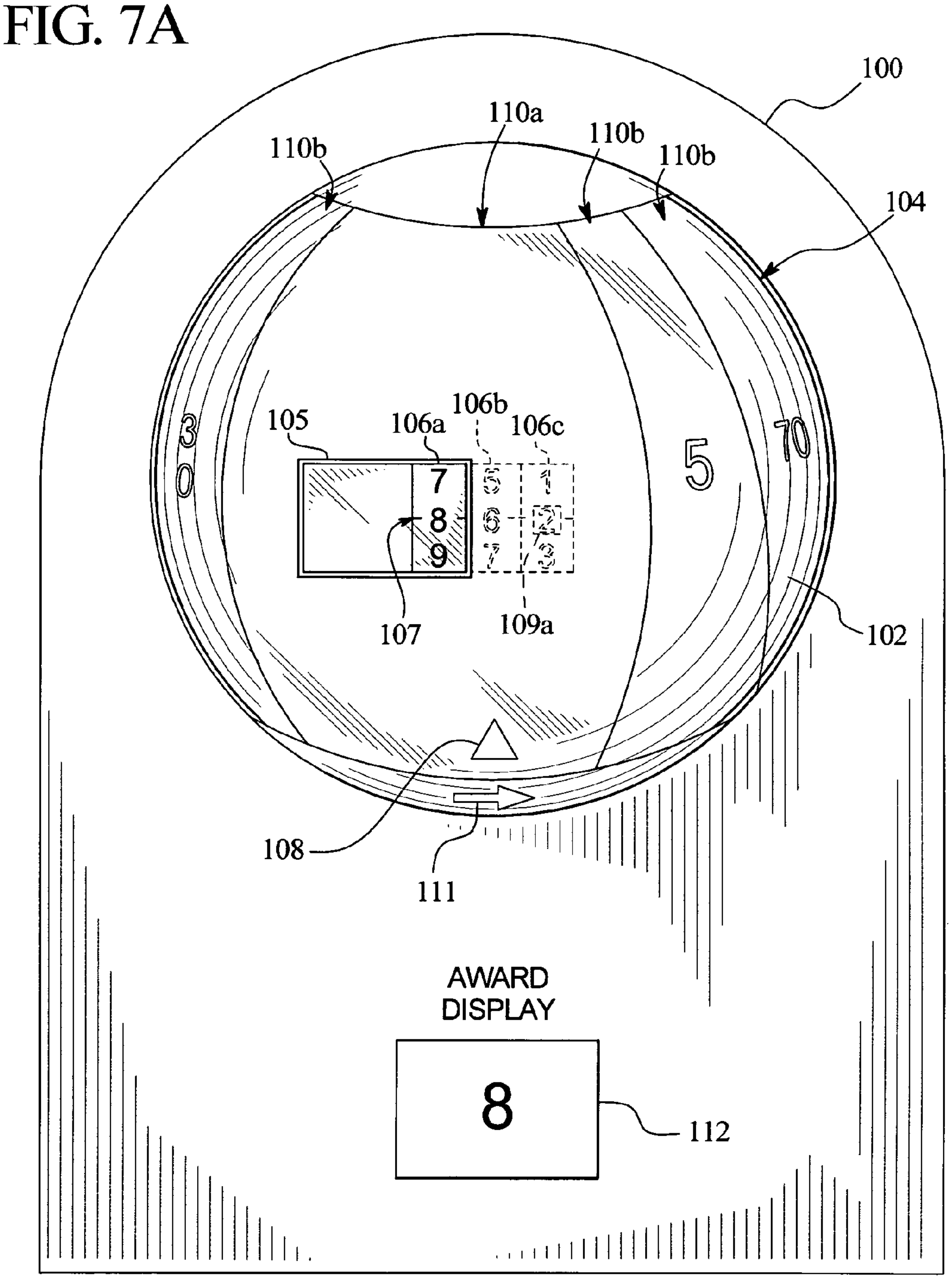
FIGS. 7A and 7B are enlarged elevation views of examples of the alternative embodiment of FIG. 6 illustrating two different ways in which the symbol indicator indicates at least one first symbol generated and displayed by the symbol display.
Figure 7B:
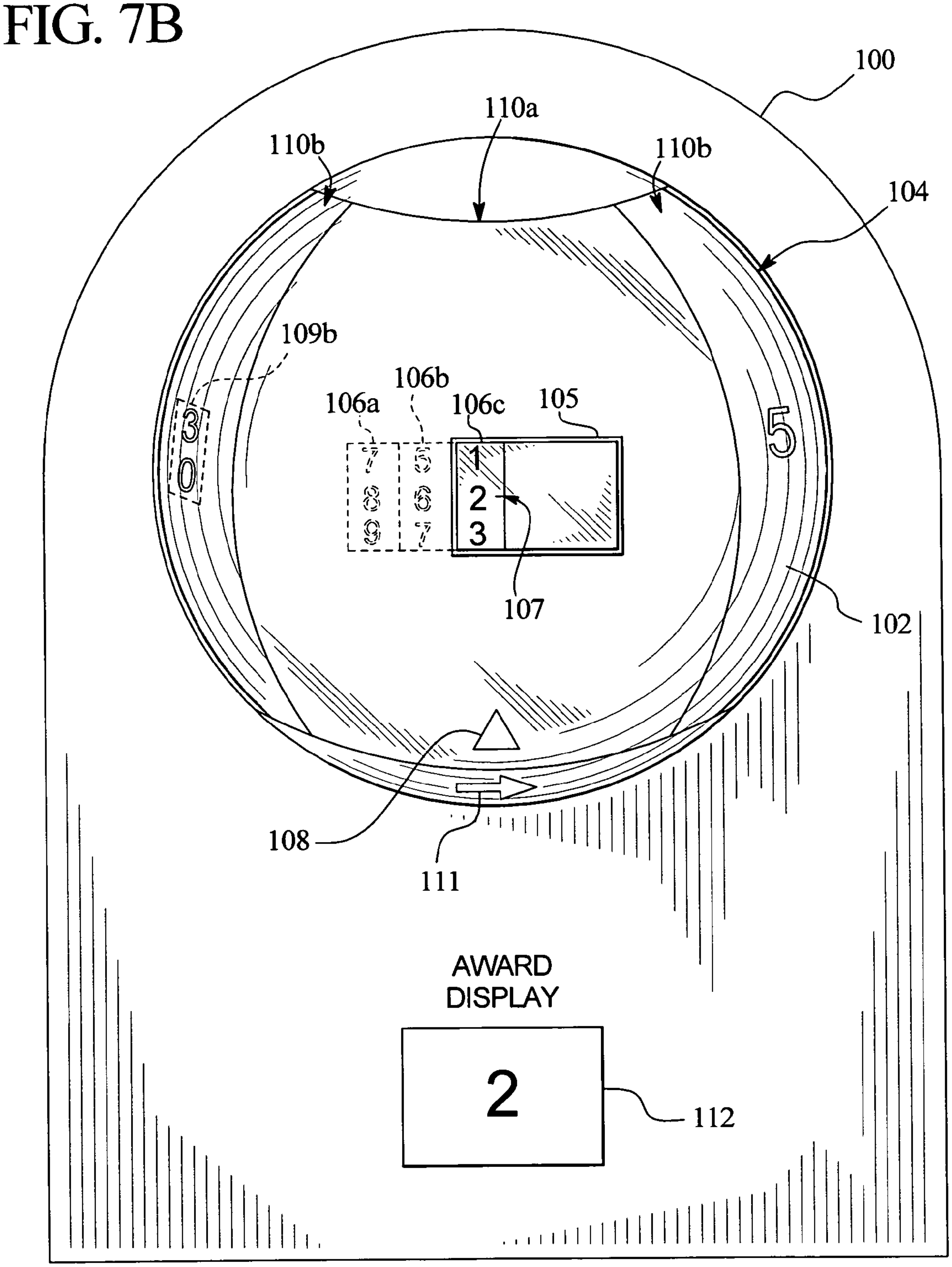

Referring now to FIGS. 7A and 7B, an example of the embodiment of FIG. 6 is illustrated where a symbol indicator 102 is rotated in a game and stops to reveal or indicate one of the reels 106*a* in section 110*a* on the symbol display. Specifically, the section 110*a* including the viewable area or window 105 stopped and positioned the viewable area 105 so that only the first reel 106*a* is viewable or visible by the player. The other two reels 106*b* and 106*c* (shown in phantom) are not visible or viewable by the player. The gaming device therefore provides the first symbol or numeral indicated on payline 107 on reel 106*a*, which is eight. The award of eight becomes the player's outcome or award in this activation or spin of the symbol indicator and this award is transferred to the award display 112. It should thus be appreciated that the outcome in this embodiment is based on the symbol(s) of the symbol display which are viewable through the symbol indicator. This may include one or more of the symbols.

As illustrated in FIG. 7A, the positioning of the viewable area or window 105 in part determines the outcome or award provided to the player. For example, if the viewable area or window 105 rotates and is positioned to show the entire symbol display or all three of the reels 106*a*, 106*b* and 106*c* (i.e., all of the reels are visible or viewable by the player), the gaming device provides an outcome or award based on the symbols 8, 6 and 2 indicated on payline 107. This symbol combination and specifically, the order of this symbol combination forms the outcome or award provided to the player, which is eight hundred sixty-two. Therefore, the positioning of the viewable area or window 105 provides the player with an outcome or award of eight instead of eight hundred sixty-two. As a result, the potential positioning of the viewable area or window in each activation of the symbol indicator adds excitement or enjoyment for a player in the game because the player does not know whether they will receive a relatively small award or a much larger award in the game.

Referring to FIG. 7B, another example of the embodiment of FIG. 6 is illustrated where the viewable area or window 105 rotates with section 110*a* of the symbol indicator 102 in the direction indicated by arrow 111. In this example, the section including the viewable area or window 105 stops and positions the viewable area 105 so that reel 106*c* is the only reel viewable or visible in the viewable area 105 by the player. The gaming device therefore provides an outcome or award of two based on the symbol or numeral two occurring on payline 107 associated with reel 106*c*.

The above example illustrates how the positioning of section 110*a* including the viewable area or window 105 determines in part the value or amount of the outcome or award provided to the player. For example, the viewable area or window 105 may be positioned to reveal a portion of the symbol display such as reel 106*a* or reels 106*a* and 106*b*, or the entire symbol display such as all of the reels 106*a*, 106*b* and 106*c*. Similarly, the viewable area or window 105 may be positioned to reveal reel 106*c* or reels 106*c* and 106*b*. Therefore, the particular reels and the values or symbols indicated on those reels determines the other part of the outcome or award provided to the player in the game. This adds further excitement and enjoyment to the player because the player does not know the amount or value of the award that will be provided to the player until the symbol indicator and the viewable area or window 105 stop rotating to display the symbol or symbols which indicate the symbol order which forms the outcome or award. As illustrated in FIG. 7B, the gaming device provides an award of two to the player based on the symbol or numeral two indicated on payline 107 in that activation or spin of the symbol indicator. The award of two is the outcome or award provided to the player as indicated by the award display 112.

Figure 8:
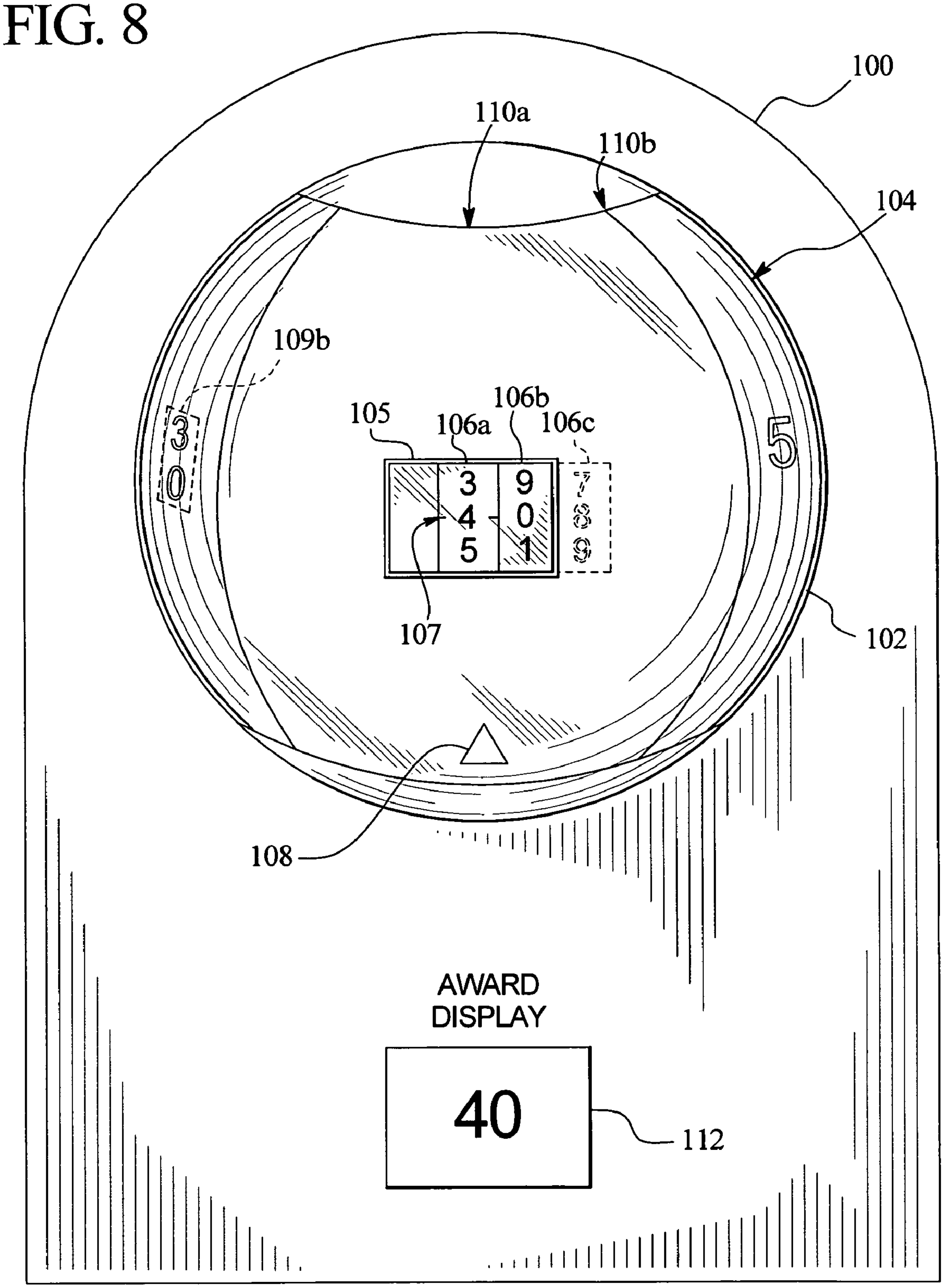
FIG. 8 is an enlarged elevation view of the alternative embodiment of FIG. 6 illustrating an example where the section indicator indicates the section including the viewable area and the viewable area reveals a portion of the symbol display.

Referring now to FIG. 8, another example of the embodiment FIG. 6 is illustrated where the symbol indicator is activated and rotated in a game. In this example, the section 110*a* including the viewable area or window 105 stops and is positioned to reveal a portion of the symbol display such as reels 106*a* and 106*b* of the plurality of reels. The symbols or numerals 4 and 0 are indicated on payline 107 in the viewable area 105 and therefore the gaming device provides an award of forty to the player. The award of forty is based on the order of the symbols such as the numerals or digits indicated on payline 107 in that activation or spin of the symbol indicator 102. As shown in FIG. 6, the gaming device would have provided an award of four hundred eight if all three of the reels were indicated or visible in the viewable area or window 105. The award of forty is provided to the player as indicated by the award display 112.

Figure 9A:
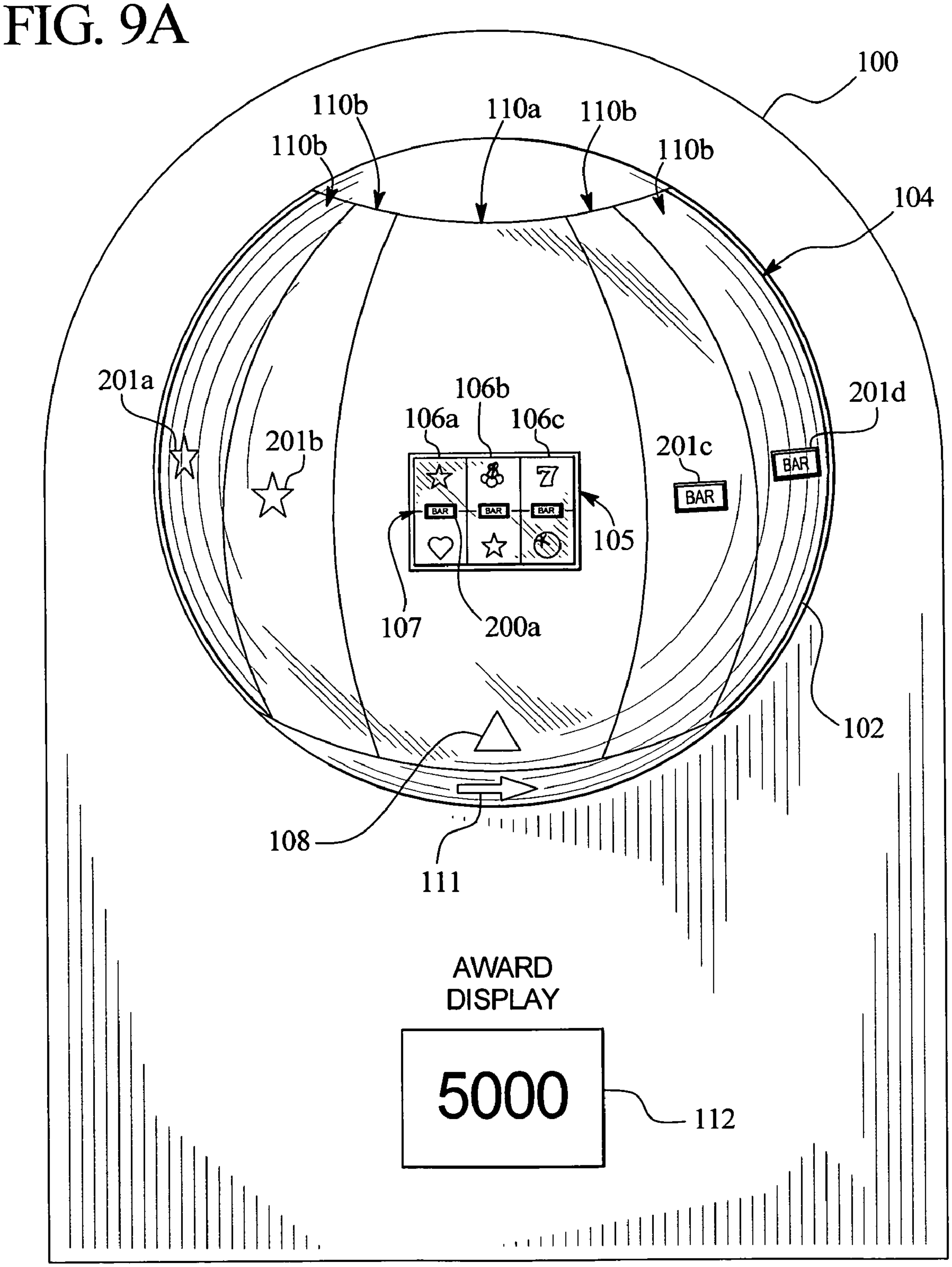
FIG. 9A is an enlarged elevation view of a further alternative embodiment of the display device of the present invention illustrating a symbol display which generates and displays a plurality of first symbols representing game elements and a symbol indicator including sections having second symbols representing one or more of the same game elements generated and displayed by the symbol display.
Figure 9B:
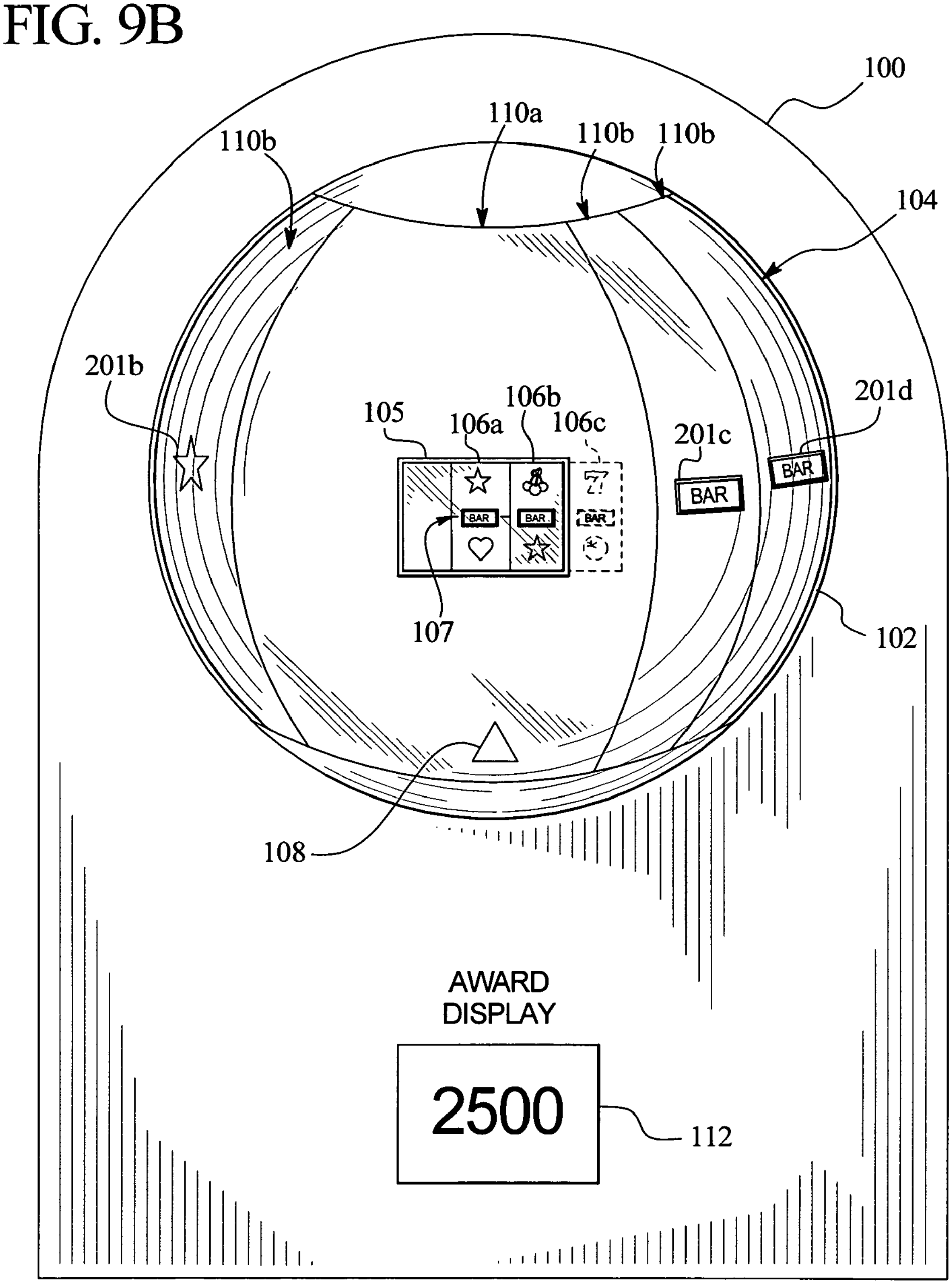
FIG. 9B is an enlarged elevation view of an example of the alternative embodiment of FIG. 9A illustrating the section indicator indicating the section of the symbol display including the viewable area and where the viewable area reveals a portion of the symbol display.

Referring to FIGS. 9A and 9B, another embodiment of the present invention is illustrated where the symbols 200*a* on the symbol display or reels 106*a*, 106*b* and 106*c* include symbols such as a star symbol, a cherry symbol, a bar symbol, an orange symbol, a heart symbol and a seven symbol. Additionally, the sections 110*b* include second symbols 200*b* which are the same as the symbols 200*a* on the reels 106*a*, 106*b* and 106*c*. Specifically, sections 110*b* include at least one of the symbols 200*a* indicated on the reels. It should be appreciated that the first symbols and the second symbols may include the same symbols or at least one different symbol in a game.

In FIG. 9A, in one example, the reels are activated upon a triggering event in the game. The gaming device rotates or spins the symbol indicator 102 in the direction indicated by the arrow 111. The symbol indicator 102 stops rotating and the section indicator 108 indicates one of the sections 110 of the symbol indicator 102. In one embodiment, the gaming device provides an outcome or award to the player for any designated winning symbol combinations including the symbols 200*a* indicated on payline 107 associated with the reels and any second symbols 200*b* of sections 110*b* which are visible or viewable by the player. For example, as illustrated in FIG. 9A, when the viewable area or window 105 is positioned to reveal or indicate the entire symbol display or all of the reels 106*a*, 106*b* and 106*c*, the gaming device provides an award based on the symbol combination including the symbols 200*a* indicated on payline 107, which in this example are three bar symbols, and any of the second symbols of sections 110*b*, such as the bar symbols 201*c* and 201*d* or the star symbols 201*a* and 201*b*. In this example, the gaming device provides an award associated with the symbol combination including the three bar symbols on payline 107, and the bar symbols 201*c* and 201*d* of section 110*b*. In this example, a symbol combination including five bar symbols provides an award of five thousand as indicated by the award display 112. In this example, the gaming device provides an outcome or award associated with any winning symbol combinations including identical symbols which are directly adjacent to each other on payline 107. It should be appreciated that the gaming device may provide an outcome or award for any winning symbol combinations indicated of the symbol display and the respective or designated sections of the symbol indicator in a game.

Referring to FIG. 9B, an example of the embodiment of FIG. 9A is illustrated where the viewable area or window 105 of section 110*a* is positioned to reveal or indicate reels 106*a* and 106*b* in an activation of the symbol indicator in the game. The gaming device determines whether the first symbols indicated on payline 107 on reels 106*a* and 106*b* and any second symbols 203*a*, 203*b* and 203*c* of sections 110*b* form a winning symbol combination in the game. In this example, the two bar symbols indicated on payline 107 and the bar symbols 201*c* and 201*d* of the sections 110*b* form a winning symbol combination including four bar symbols in the game. The winning symbol combination including four bar symbols provides an award of two thousand five hundred as indicated by the award display 112.

As shown in FIG. 9B, the hidden or none revealed reel 106*c* also generated a first symbol which is a bar symbol. Therefore, if the viewable area or window was positioned to reveal the entire symbol display or all three of the reels 106*a*, 106*b* and 106*c*, the gaming device would of provided an award or outcome based on a symbol combination including five bar symbols as illustrated in FIG. 9A. Therefore, the positioning of the viewable area 105 was the difference between the player receiving an award of five thousand as shown in FIG. 9A and an award of two thousand five hundred as shown in FIG. 9B.

Figure 10A:
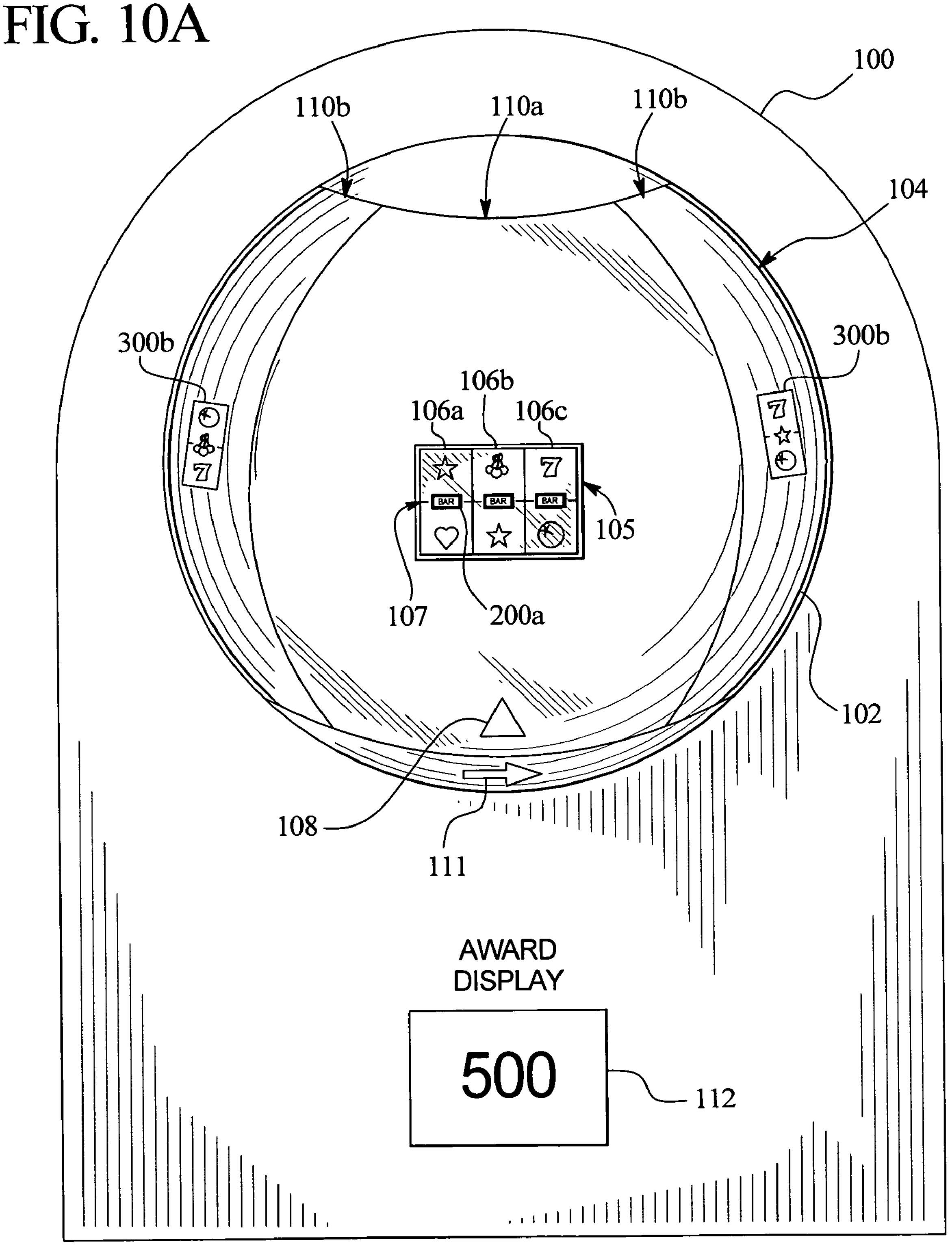
FIG. 10A is an enlarged elevation view of an alternative embodiment of the display device of FIG. 9A illustrating a symbol indicator including sections having reel strips that display a plurality of second symbols representing game elements.
Figure 10B:
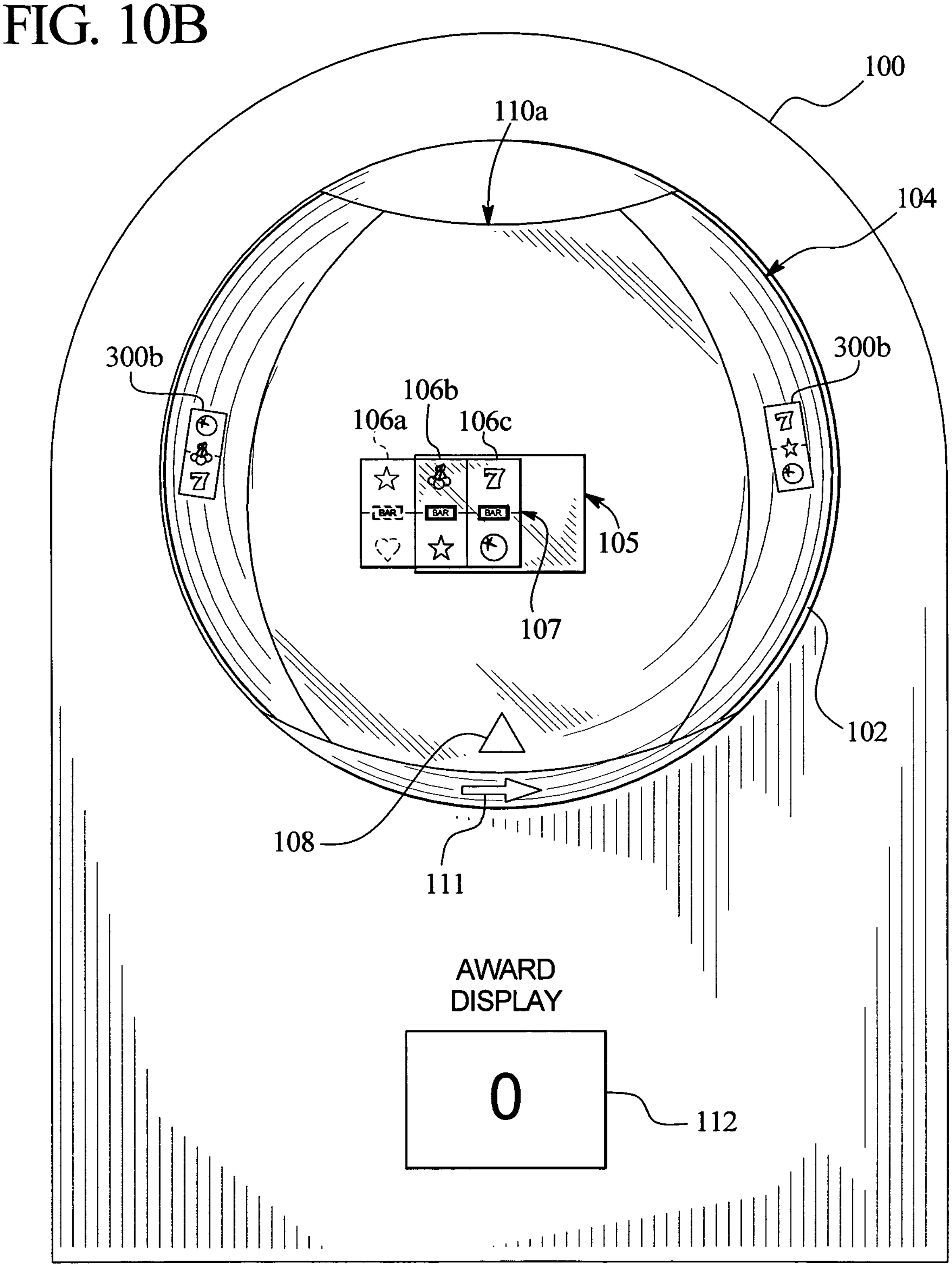
FIG. 10B is an enlarged elevation view of an example of the alternative embodiment of FIG. 10A illustrating the section indicator indicating the section of the symbol display including the viewable area and where the viewable area reveals a portion of the symbol display.

Referring to FIGS. 10A and 10B, a further alternative embodiment of the present invention is illustrated where the symbol display includes a plurality of reels 106*a*, 106*b* and 106*c* having similar symbols or game elements to the embodiment shown in FIG. 9A and 9B. In this embodiment, the sections 110*b* include reel strips such as reel columns 300*b* including the second symbols. The second symbols included of the reel columns or reel strips 300*b* are the same as the symbols indicated on reels 106*a*, 106*b* and 106*c*.

In this embodiment, the gaming device activates or spins the symbol display or reels 106*a*, 106*b* and 106*c* upon a triggering event in the game, and then moves or rotates the symbol indicator 102 in the direction of arrow 111. The gaming device provides an outcome or award based on the first symbols indicated on payline 107 associated with reels which are visible in the viewable area 105 and any symbols associated with the reels strips or reel columns 300*b* of sections 110*b*. For example, in FIGS. 10A, the viewable reels indicate three bar symbols on payline 107. However, the reel strips or reel columns 300*b* do not include any bar symbols on payline 107. Therefore, the gaming device provides an outcome or award based on a winning symbol combination including three bar symbols. It should be appreciated that if the reel strips 300*b* included one or more bar symbols associated with payline 107, the gaming device would have provided an award or outcome based on a winning symbol, including a combination of four or more bar symbols.

Alternatively, the gaming device may provide an award based on any symbol combinations including any of the symbols on reels 106*a*, 106*b*, 106*c* and any of the symbols on the reel columns or reel strips 300*b* in a game (i.e., a scatter pay symbol combination). Therefore, the gaming device provides an award or outcome based on any winning symbol combinations occurring on the reels (regardless of whether the symbols are on a certain payline) to the player.

Referring to FIG. 10B, an example of the alternative embodiment of FIG. 10A is illustrated where the gaming device activates the reels 106*a*, 106*b* and 106*c* upon a triggering event in a game. The gaming device then moves or rotates the symbol indicator 102. The section indicator 108 indicates section 110*a* including the viewable area or window 105. In this example, the viewable area or window 105 is positioned to reveal or indicate reels 106*b* and 106*c*. Therefore, reel 106*a* is not viewable or is hidden from the player. The gaming device determines whether the first symbols indicated on reels 106*b* and 106*c* and any symbols of the reel strips or columns 300*b* form a designated winning symbol combination in the game. The first symbols indicated on payline 107 associated with the viewable reels 106*b* , 106*c* and the second symbols indicated on payline 107 on reels strips 300*b*, do not form a winning symbol combination because only two identical symbol are indicated on payline 107 (i.e, the two bar symbols). The gaming device therefore does not provide an award to the player in this activation as indicated by the award display 112. This example illustrates how the positioning of the viewable area 105 and the first and second symbols displayed to the player affect the outcome or award provided to a player in a game.

Alternatively, in another embodiment, the gaming device provides an award or outcome for any winning symbol combinations including any of the symbols on the viewable reels and the sections 110*b* displayed to the player. For example, the reels 106*b* and 106*c* and the reel columns or reel strips 300*b* indicate three orange symbols and three seven symbols in the game. Therefore, the gaming device provides the largest award or outcome associated with the winning symbol combinations to the player in the game. In another embodiment, the gaming device provides the outcomes or awards associated with all of the winning symbol combinations on the reels and the reels strips. It should be appreciated that the gaming device may sum, multiply or otherwise modify the awards associated with all of the winning symbol combinations occurring on the reels and provide the total award to the player in the game. It should be appreciated that the outcomes or awards associated with one or more winning symbol combinations formed by symbols on the reels and the reels strips may be provided to the player in the game.

Figure 11:
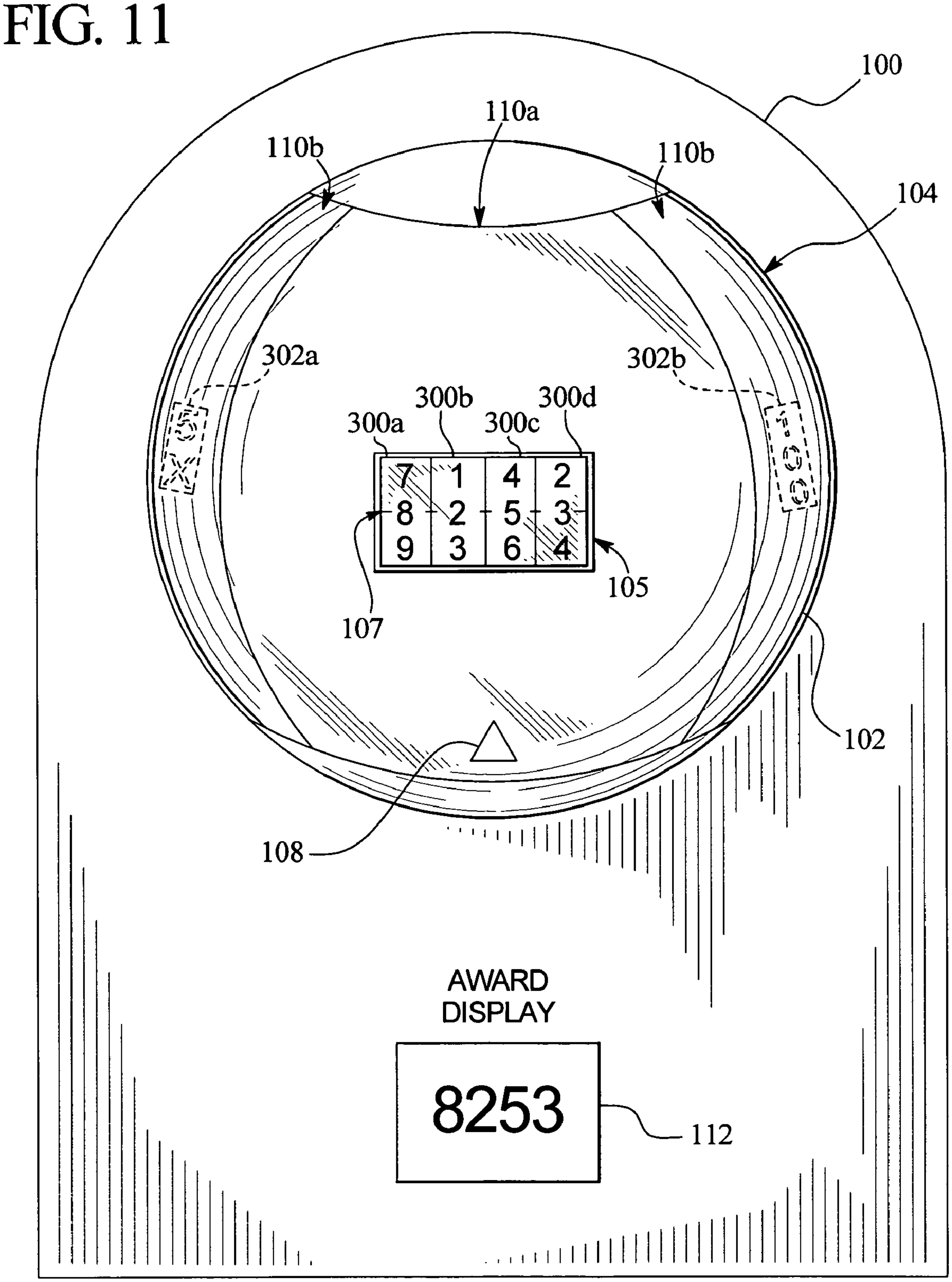
FIG. 11 is an enlarged elevation view of other alternative embodiments of the present invention where the symbol display includes four reels and the sections of the symbol indicator include at least one modifier and at least one award.

Referring to FIG. 11, another alternative embodiment of the present invention is illustrated where the symbol display includes a plurality of reels such as four reels 300*a*, 300*b*, 300*c* and 300*d*. The addition of another reel to the symbol display further increases the size or amount of the potential outcome or award in a game. For example, the outcome or award provided to the player for the first symbols or numerals indicated on payline 107 is an award formed by the numbers (in order) 8, 2, 5 and 3 or eight thousand two hundred fifty-three. This award is much larger than the award or outcome associated with a symbol display including three reels, where the largest award on these reels including similar numerals (i.e., 0 to 9) would be nine hundred ninety-nine. Therefore, the addition of one or more reels to the symbol display significantly increases the amount or size of the award or outcome provided to the player in a game. This further increases the excitement and enjoyment of the game for the player.

A further embodiment is also illustrated in FIG. 11, where the sections 110*b* include a plurality of different second symbols 302 where the second symbols represent awards or values such as the value one hundred associated with the second symbol 302*b* or modifiers or multipliers such as the multiplier 5× associated with the second symbol 302*a*. It should be appreciated that the second symbols may represent any suitable symbols, awards, values, modifiers, game elements or any other suitable award or outcomes.

Although the above embodiments generally describe a symbol indicator including one section having a viewable area or window, it should be appreciated that the symbol indicator may include one or a plurality of viewable areas or windows. In addition, in one embodiment, the viewable area or window 105 is approximately the same size and shape as the symbol display. In another embodiment, the viewable area or window 105 is wider or otherwise larger than the symbol display. In a further embodiment, the viewable area is smaller than the symbol display to only enable a player to see or view a particular portion of a symbol display. It should be appreciated that the viewable area or window 105 may be any suitable size or shape.

In one embodiment, the symbol indicator includes a plurality of sections where at least two of the sections include viewable areas or windows. In this embodiment, the viewable areas are different sizes to display a different number of symbols of the symbol display. In one embodiment, a first viewable area displays at least one symbol of the symbol display and a second viewable area displays a different number of symbols of the symbol display, where the number of symbols displayed by the second viewable area is greater than one. For example, the first viewable area displays one symbol of the symbol display and the second viewable area display three symbols of the symbol display. It should be appreciated that the viewable areas may be any suitable size or shape and may display any suitable number of symbols of the symbols display as long as the number of symbol displayed by each of the viewable areas is different.

Figure 12:
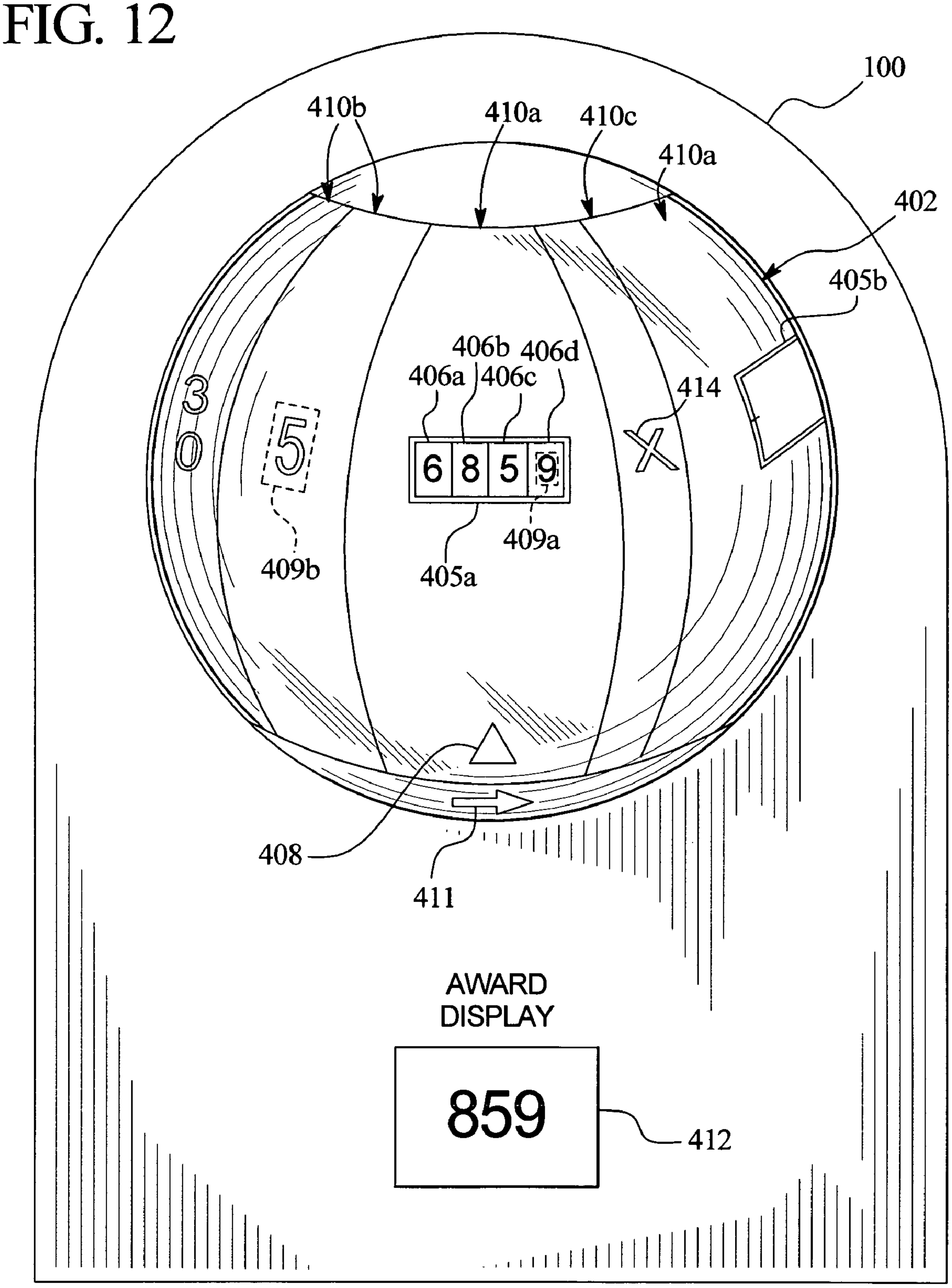
FIG. 12 is an enlarged elevation view of a further alternative embodiment of the present invention where the symbol indicator includes at least two viewable areas which are separated by a modifier.

Referring now to FIG. 12, an alternative embodiment of the present invention is illustrated where the symbol display includes a plurality of reels, 406*a*, 406*b*, 406*c* and 406*d*. The reels 406*a*, 406*b*, 406*c* and 406*d* include a plurality of first symbols 409*a* which represent numerals or numbers. The gaming device also includes a symbol indicator 402 which, in this embodiment, includes a plurality of sections such as sections 410*a*, 410*b* and 410*c*. The sections 410*a* each include a viewable area or window such as viewable areas 405*a* and 405*b*. In this embodiment, a modifier 414 such as a multiplier represented by the multiplication sign is on a section 410*c* between the sections 410*a* including viewable areas or windows 405*a* and 405*b*. The modifier 414 modifies at least one of the first symbols visible through viewable area 405*a* and at least one of the first symbols visible through viewable area 405*b*. It should be appreciated that the modifier 414 may be a multiplication symbol, an addition symbol, a subtraction symbol, a division symbol or any suitable modifier or modifiers. Additionally, the sections 410*b* include at least one second symbol such as the outcomes or awards 409*b* indicated on those sections. A section indicator 408 indicates one or more of the sections on the symbol indicator 402 in a game. The symbol indicator 402 moves or rotates in the direction indicated by the arrow 411.

In one embodiment, upon a triggering event associated with a game, the gaming device activates or spins the reels 406*a*, 406*b*, 406*c* and 406*d* to indicate at least one first symbol 409*a* on each of those reels. The gaming device then moves or rotates the symbol indicator 402. It should be appreciated that the gaming device may move or rotate the symbol indicator 402 before activating the symbol display, may activate the symbol display before moving or rotating the symbol indicator, or activate the symbol display and move the symbol indicator 402 in any suitable order. When the symbol indicator 402 stops moving or rotating, the section indicator 408 indicates one of the sections of the symbol indicator. In this embodiment, each viewable area 405*a* or viewable area 405*b* may indicate zero, one, a plurality or all of the first symbols 409*a* generated by the symbol display in a game. For example, the viewable area 405*a* is positioned to reveal all of the numbers (i.e., first symbols) displayed by the symbol display or reels 406*a*, 406*b*, 406*c* and 406*d*. In one embodiment, the gaming device provides each player with an outcome which equals the value of the number displayed on the reels in the order that the numbers are displayed on the reels. Therefore, the gaming device provides the player with an outcome or award of six thousand eight hundred fifty-nine as indicated by the award display 412. The symbol indicator 402 may also be positioned in a game to reveal at least one first symbol 409*a* in each of the viewable areas 405*a* and 405*b* such that one or more first symbols are visible through the viewable areas 405*a* and 405*b*. Because first symbols or numbers 409*a* are indicated in each viewable area 405*a* and 405*b*, the gaming device modifies the first symbol or symbols indicated in viewable area 405*a* by the first symbol or symbols indicated in viewable area 405*b* using the modifier 414. If each section indicator 408 indicates one of the sections 410*b* including a second symbol 409*b*, the gaming device provides the outcome such as the award value of five or thirty to the player.

Figure 13A:
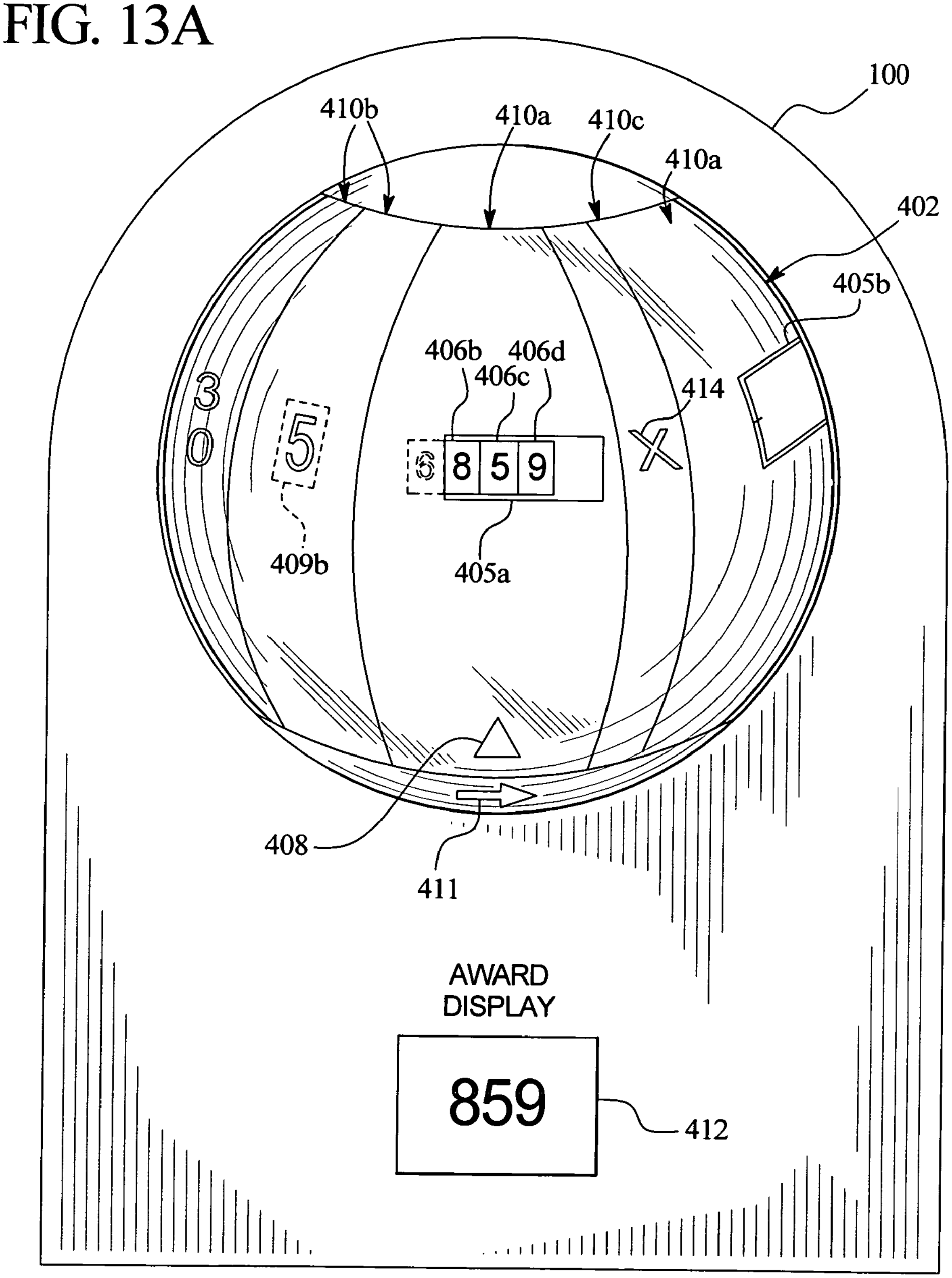
FIG. 13A is an enlarged elevation view of the embodiment of FIG. 12 where three of the first symbols are visible through one of the viewable areas of the symbol indicator.

Referring now to FIG. 13A, an example of the alternative embodiment of FIGS. 12 is illustrated where one of the sections 410*a* including viewable area 405*a* is positioned to reveal or display three of the reels 406*b*, 406*c* and 406*d*. Because at least one of the first symbols of the reels is not visible through each of the viewable areas 405*a* and 405*b*, the gaming device does not use the modifier 414 to modify the first symbols. In this example, the gaming device provides an outcome equal to the value of the number indicated on reels 406*b*, 406*c* and 406*d* which are visible through the viewable area 405*a*. The value of the number visible through the viewable area 405*a* is eight hundred fifty-nine which is provided to the player as indicated by the award display 412.

Figure 13B:
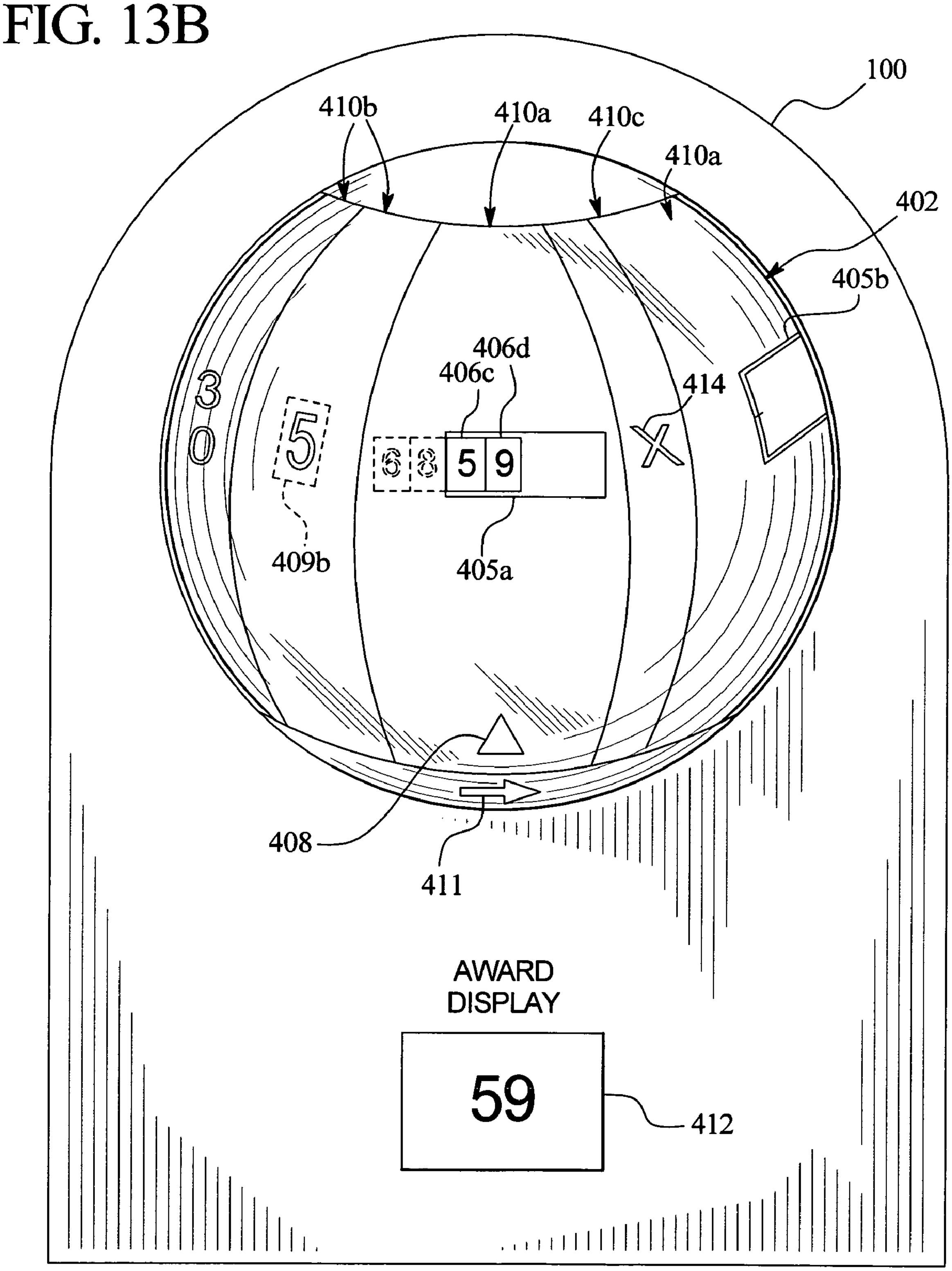
FIG. 13B is an enlarged elevation view of another example of the embodiment of FIG. 12, where two of the first symbols are visible through one of the viewable areas of the symbol indicator.

Referring now to FIG. 13B, another example of the embodiment of FIG. 12 is illustrated where the section 410*a* of the symbol indicator 402 including viewable area 405*a* is positioned to indicate or reveal the first symbols on reels 406*c* and 406*d*. Again, because at least one first symbol is not visible through each of the viewable areas 405*a* and 405*b*, the gaming device does not use the modifier 414 in this spin or activation of the symbol indicator 402. The gaming device provides the player with an outcome equal to the value of the number indicated or visible through the viewable area 405*a* which is fifty-nine. The outcome of fifty-nine is provided to the player as indicated by the award display 412. It should be appreciated that the first symbols or numbers indicated or visible through the viewable area 405*a* or the viewable area 405*b* may be added, multiplied, subtracted, or modified using any other suitable modifier or modification method.

Figure 13C:
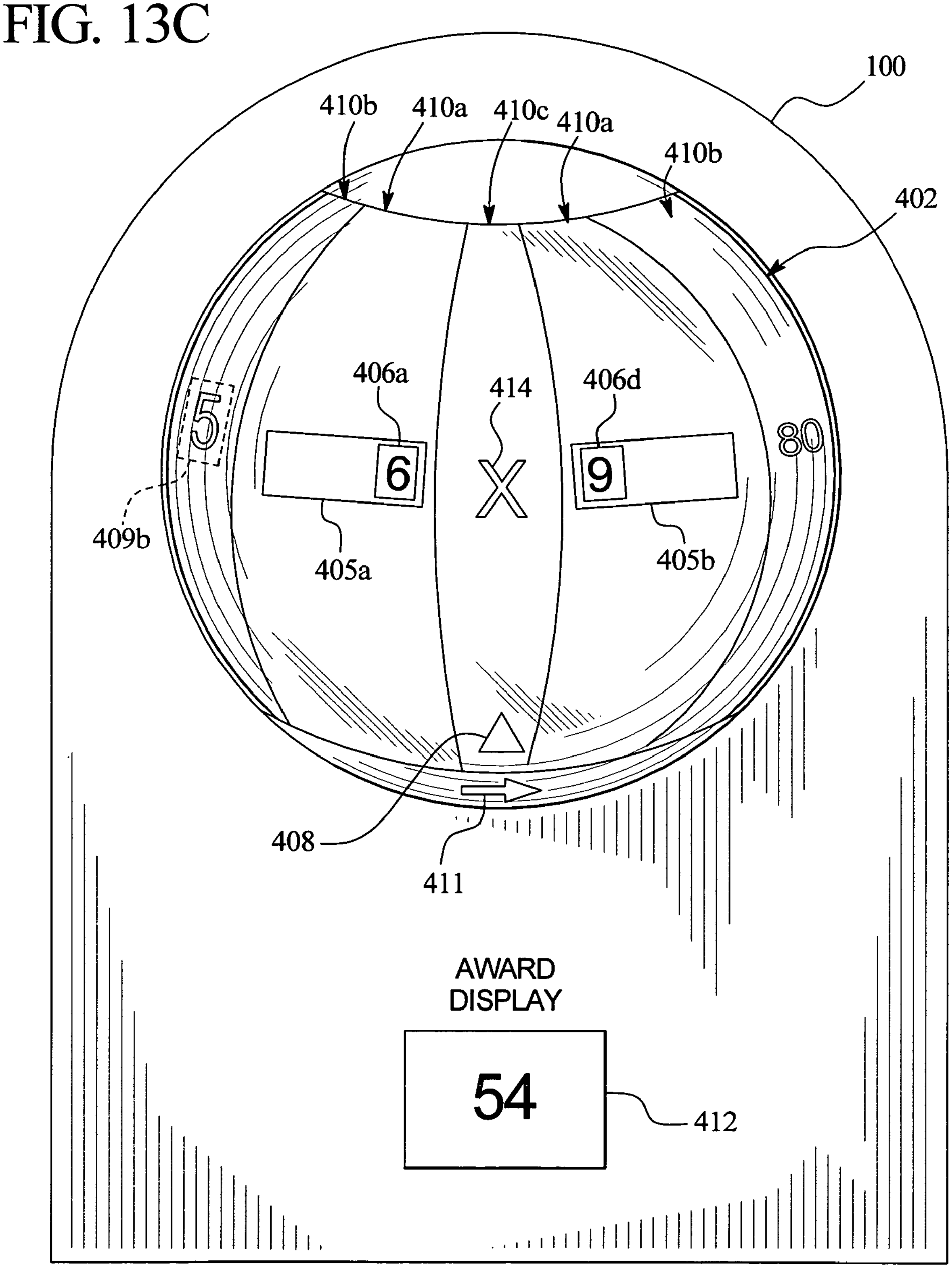
FIG. 13C is an enlarged elevation view of a further example of the embodiment of FIG. 12 where the sections including the viewable areas are positioned to each reveal at least one first symbol of the symbol display, wherein the first symbols are modified using a modifier.

Referring now to FIG. 13C, a further example of the embodiment of FIG. 12 is illustrated where the symbol indicator moves and positions the section 410*a* including the viewable areas 405*a* and 405*b* to reveal one first symbol on each of the reels 406*a* and 406*d*. Because at least one first symbol is visible through each of the viewable areas 405*a* and 405*b*, the gaming device uses the modifier 414 which is indicated by the section indicator 408, to modify the first symbols visible through the viewable areas 405*a* and 405*b*. As a result, the gaming device provides an outcome to the player which equals the first symbol on reel 406*a* multiplied by the first symbol visible through or indicated by the viewable area 405*b*. Therefore, the number six is multiplied by the number nine to provide the player with an outcome or award of fifty-four as indicated by the award display 412. Alternatively, if the modifier was an addition symbol, the gaming device would add the number six to the number nine to provide the player with an outcome or award of fifteen. This embodiment further increases a player's excitement and enjoyment of the game because the modifier changes, such as increases or decreases, a player's award in the game.

Figure 13D:
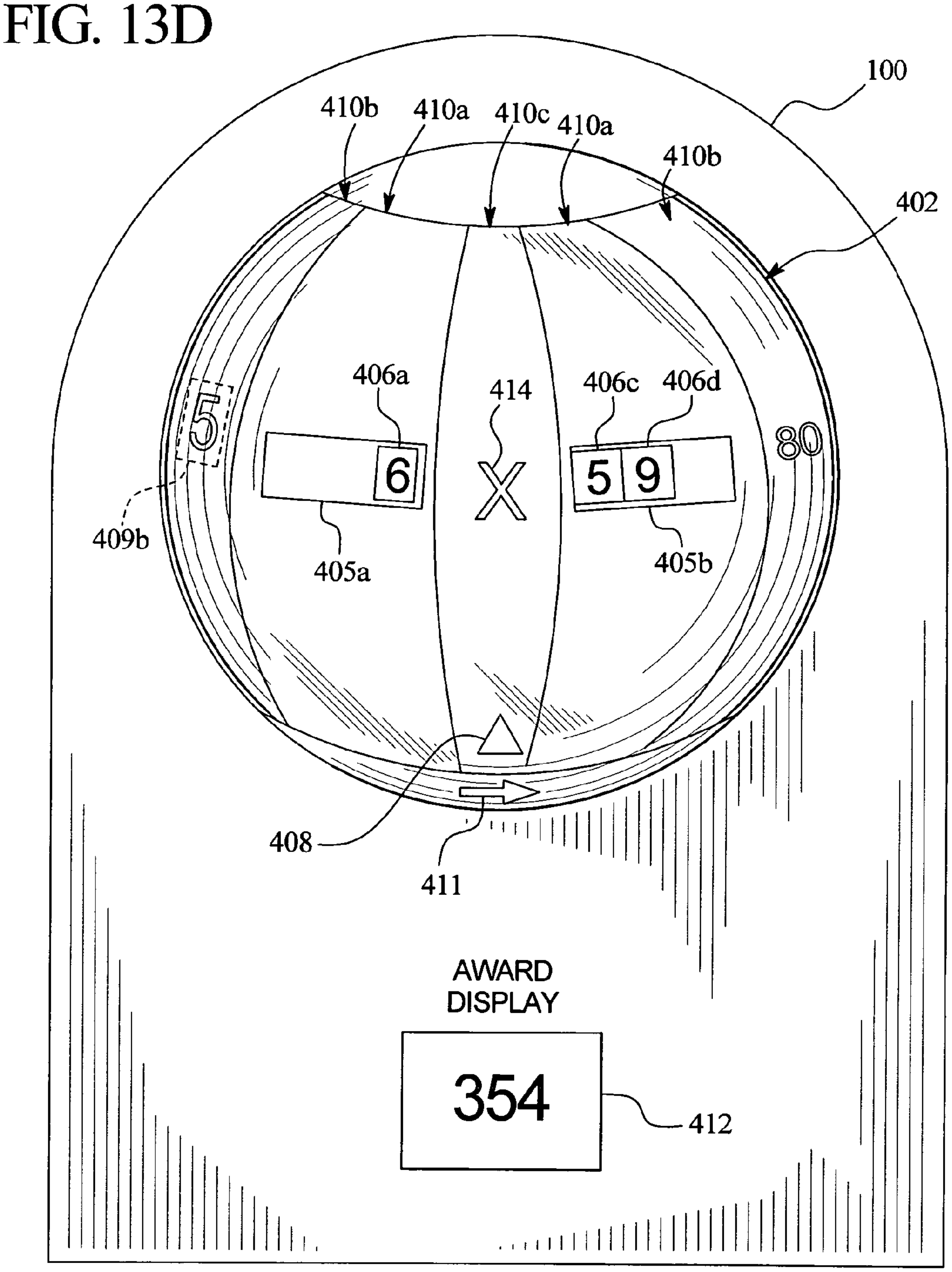
FIG. 13D is an enlarged elevation view of another example of the embodiment of FIG. 12 where the sections including one of the viewable areas is positioned to reveal at least one of the first symbols of the symbol display and the section including the other viewable area is positioned to reveal a plurality of the first symbol of the symbols display, wherein the first symbols revealed by the viewable areas are modified using a modifier.

Referring now to FIG. 13D, another example of the embodiment of FIG. 12 is illustrated where the symbol indicator includes sections 410*a* having viewable areas 405*a* and 405*b* to reveal one or a plurality of the first symbols on the symbol display. Because at least one first symbol is visible through each of the viewable areas 405*a* and 405*b*, the gaming device employs the modifier 414 to modify any award associated with the first symbols viewable through the viewable areas. In this example, the viewable area 405*a* displays one first symbol 406*a* which is the number six. The second viewable area 405*b* is positioned to display a plurality of the first symbols of the symbol display or reels 406 such as the first symbols five and nine on reels 406*c* and 406*d*, respectively. The gaming device therefore provides an outcome to the player which equals the first symbol on reel 406*a* (i.e., six) multiplied by the combination of the first symbols visible through or indicated by the viewable area 405*b* (i.e., fifty-nine). Thus, the number six is multiplied by the number fifty-nine to provide the player with an outcome or award of three hundred fifty-four as indicated by the award display 412. It should be appreciated that when a plurality of first symbols are viewable through a viewable area such as viewable area 405*b*, the first symbols may be combined to form one number such as the number fifty-nine, added together (i.e., sixteen), multiplied together (i.e., forty-five) or combined in any suitable manner. This embodiment increases players' excitement and enjoyment of the game because a player obtains a larger award when a plurality of the first symbols are viewable in one or more of the viewable areas.

Figure 14:
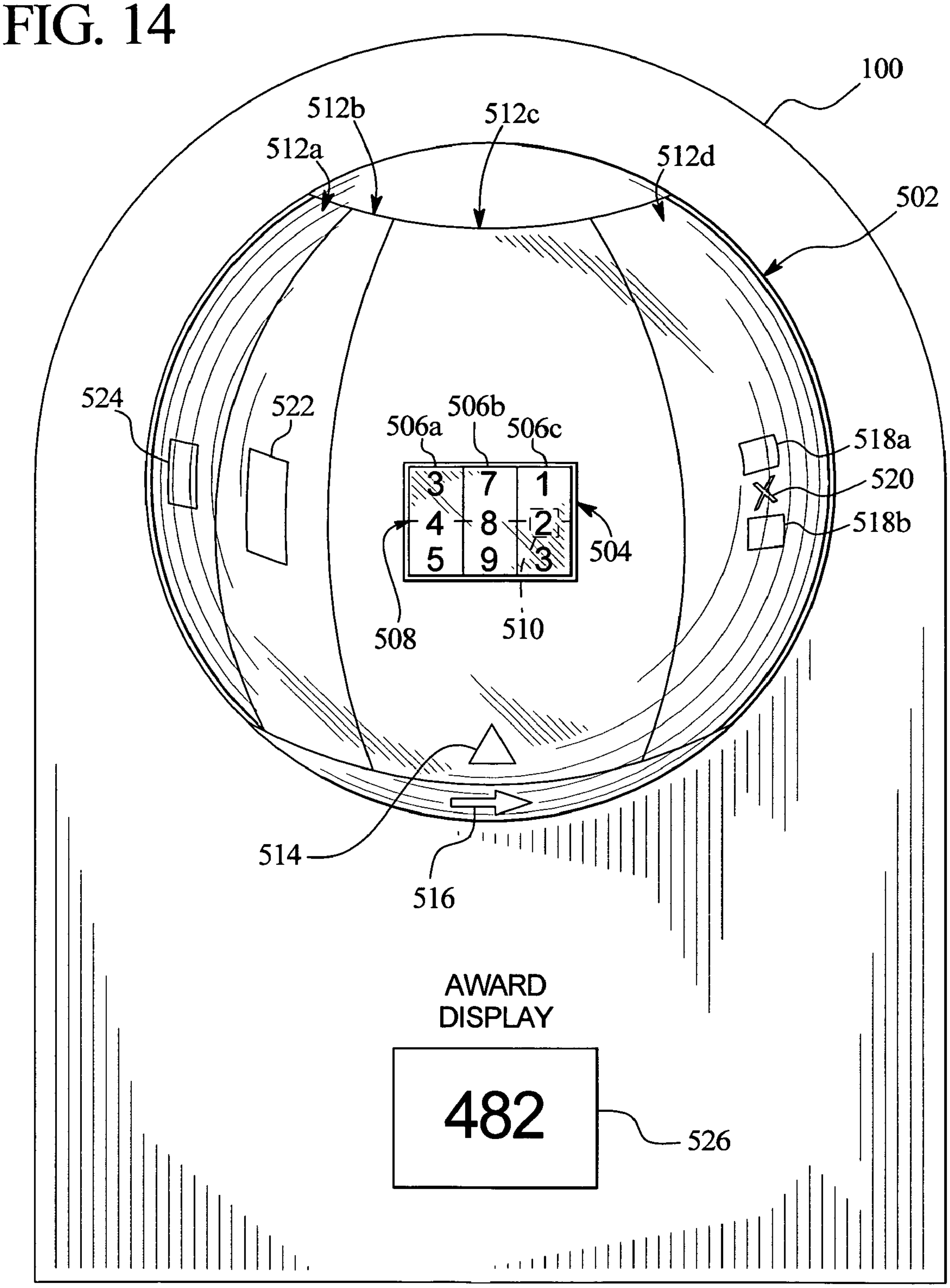
FIG. 14 is an enlarged elevation view of another alternative embodiment of the present invention where the symbol indicator includes different vertically positioned viewable areas.

Referring now to FIG. 14, another alternative embodiment of the present invention is illustrated where a symbol display includes a plurality of reels 506*a*, 506*b*, and 506*c*. The reels 506*a*, 506*b*, 506*c* include a plurality of first symbols 510 which represents numerals or numbers. The gaming device also includes a symbol indicator 502 which includes a plurality sections such as sections 512*a*, 512*b*, 512*c* and 512*d*. In this alternative embodiment, the sections include different sized viewable areas and multiple viewable areas in a single section. For example, section 512*a* includes a viewable area 524 which displays at least two of the first symbols of one of the reels 506 of the symbol display 504. Section 512*b* includes viewable area 522 which displays or otherwise indicates all of the symbols displayed by one of the reels 506 of the symbols display 504. The symbol indicator 502 also includes at least one section 512*d* which has a plurality of viewable areas in a single section such as viewable areas 518*a* and 518*b*. In this embodiment, the section 512*d* also includes a modifier such as a multiplier 520 which modifies or multiplies the numerals or numbers visible through the viewable areas 518*a* and 518*b* when section 512*d* is indicated by section indicator 514. It should be appreciated that the section including the plurality of viewable areas may or may not include a modifier such as the multiplier 520. It should also be appreciated that the numbers or numerals visible through the viewable areas 518*a* and 518*b* may be combined such as added, multiplied or modified in any suitable manner. It should further be appreciated that a section 512 may include one or more viewable areas. Section 512*c* includes a viewable area 504 which displays at least a portion of the reels 506*a*, 506*b* and 506*c*. A payline 508 is associated with the reels. In a play of the game, the symbol indicator 502 moves or rotates in the direction indicated by the arrow 516. An award display 526 displays or indicates the award provided to the player in the play of the game. This alternative embodiment creates an added excitement and enjoyment for players because the players may obtain multiple awards and a much larger award in each play of the game.

Figure 15A:
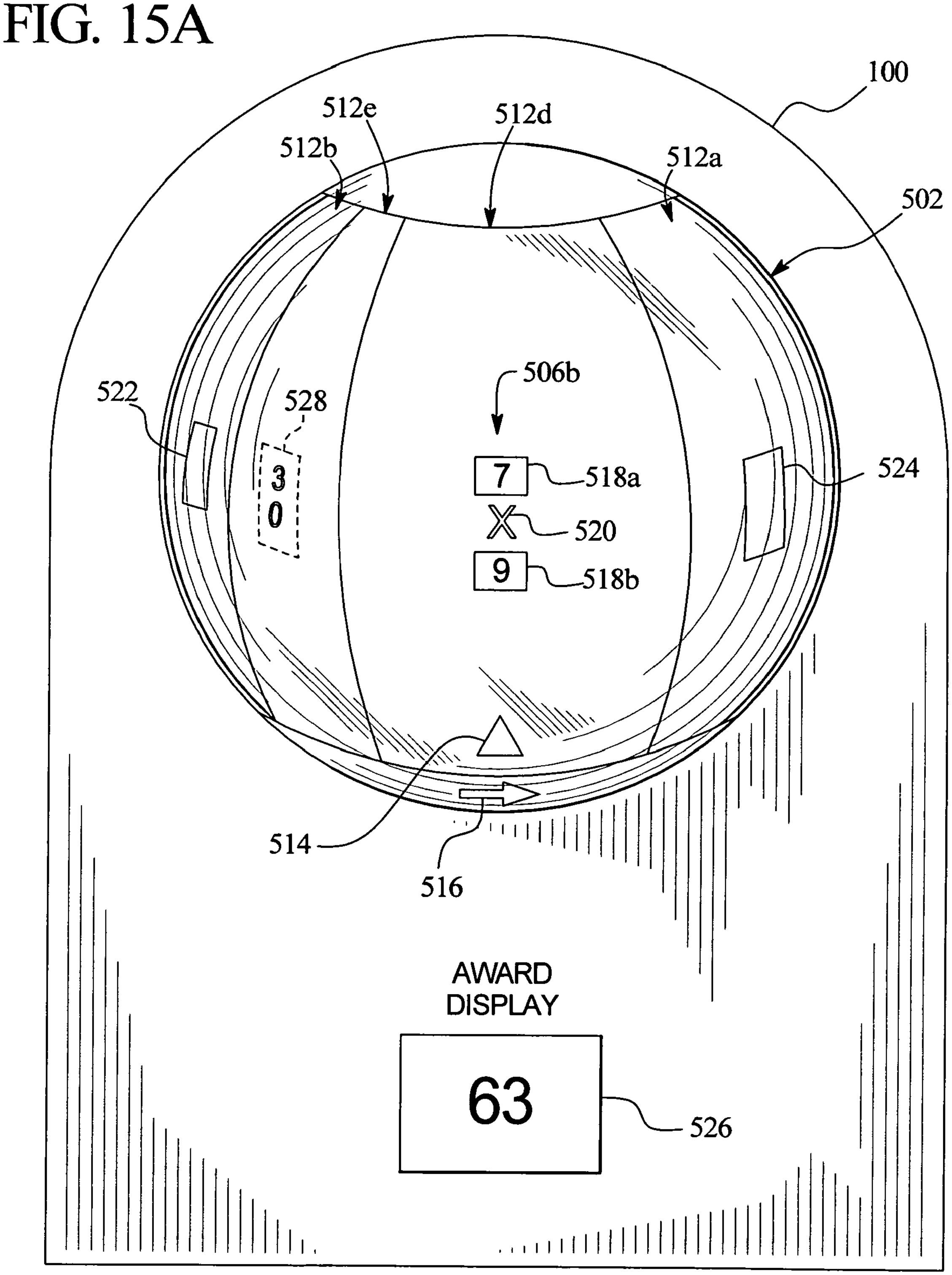
FIG. 15A is an enlarged elevation view of an example of the embodiment of FIG. 14 where different viewable areas in one section are positioned to each reveal at least one first symbol of the symbol display, wherein the first symbols are modified using a modifier.

Referring now to FIG. 15A, an example of the embodiment of FIG. 14 is illustrated where the section 512*d* including the plurality of viewable areas 518*a* and 518*b* is indicated in a play of the game. The symbol indicator is positioned to display at least two of the first symbols of reel 506*b*. A first symbol, which represents the number seven, is visible through the first viewable area 518*a*. A second symbol, which represents the number nine, is viewable or visible through the second viewable area 518*b*. The first symbols viewable through viewable areas 518*a* and 518*b* are modified by the multiplier 520. Therefore, the gaming device provides an award of sixty-three to the player in this play of this game. The award of sixty-three is indicated by the award display of 526.

Figure 15B:
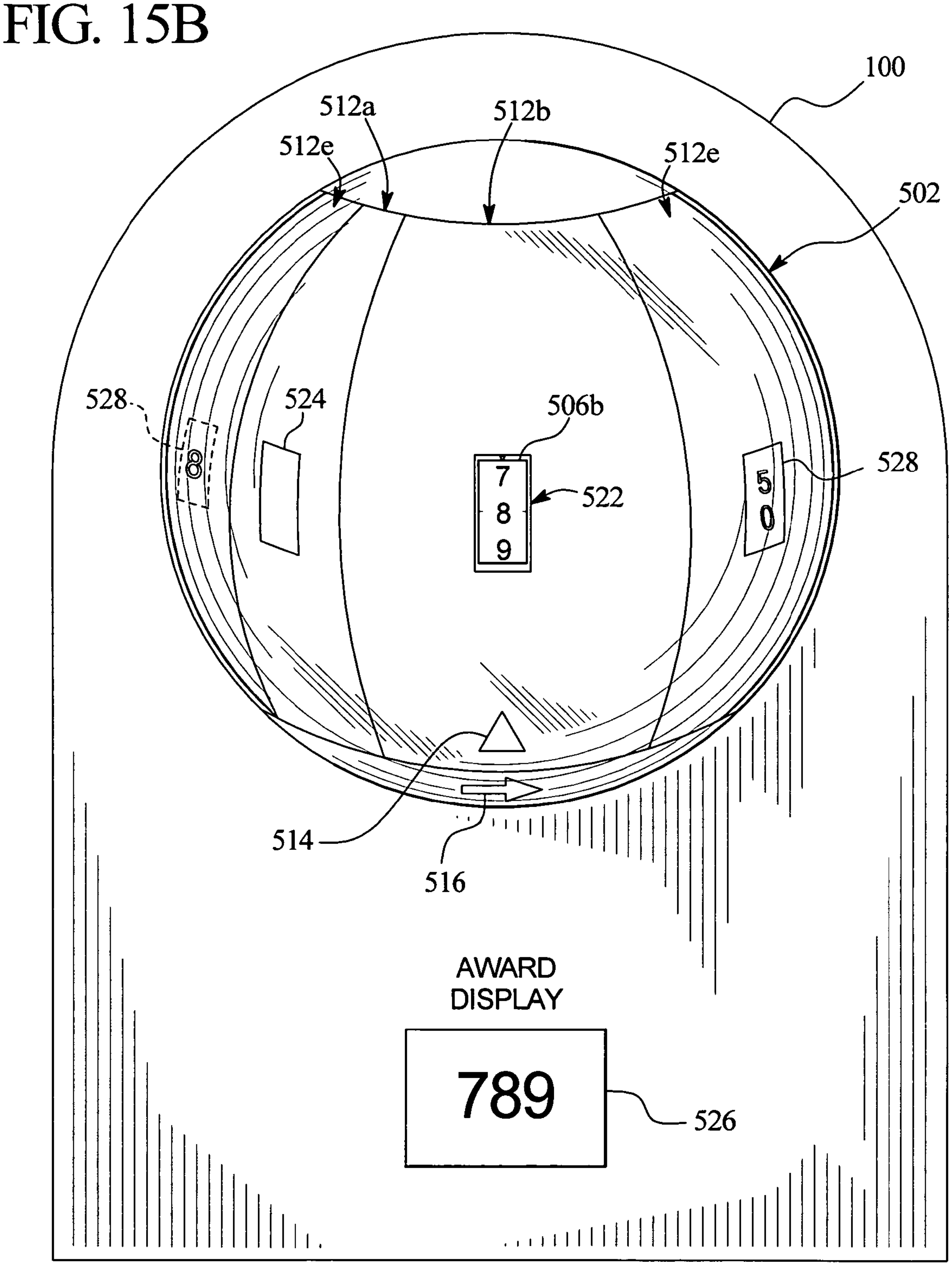
FIG. 15B is an enlarged elevation view of another example of the embodiment of FIG. 14 where a section including one of the viewable areas is positioned to reveal three of the first symbols of the symbol display.

Referring now to FIG. 15B, another example of the alternative embodiment of FIG. 14 is illustrated where the section of 512*b* including viewable area 522 is indicated by section indicator 514. The viewable area 522 displays all of the first symbols displayed by one of the reels such as reel 506*b*. In this example, the gaming device provides an award which is formed by the numbers seven, eight and nine in the order displayed by reel 506*b*. The award of seven hundred eighty-nine is transferred to the award display 526. It should be appreciated that the award may be formed using any suitable order or combination of the symbols or numbers displayed or visible through the viewable area 522. For example, the numbers may be added together to provide an award of twenty-four.

Figure 15C:
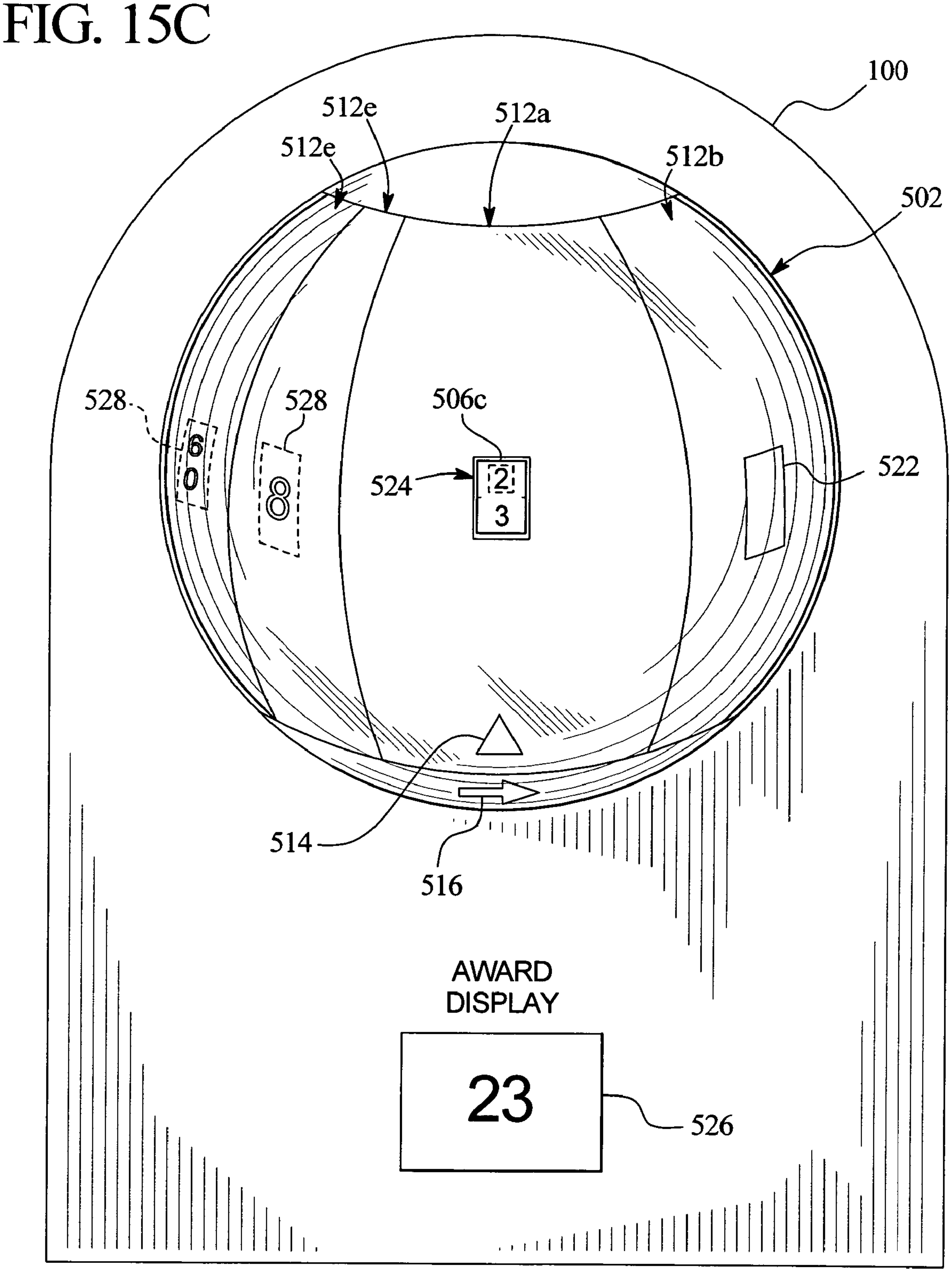
FIG. 15C is an enlarged elevation view of a further example of the embodiment of FIG. 14 where a section including one of the viewable areas is positioned to reveal two of the first symbols of the symbol display.

Referring now to FIG. 15C, a further example of the alternative embodiment of FIG. 14 is illustrated where the section 512*a* is indicated by the section indicator 514. Section 512*a* includes viewable area 524 which displays two of the first symbols on any one of the reels 506 such as reel 506*c*. Similar to the award provided in FIG. 15B, the award provided to the player is formed by the numbers displayed by or visible through the viewable area 524. Thus, an award of twenty-three is transferred to the award display 526. It should be appreciated that any suitable combination or number may be formed using the first symbols visible through the viewable area 524. The outcome or award provided in a play of the game therefore depends on the position of the viewable area 524 in relation to the reels 506. If the viewable area 524 were positioned over a different reel 506, the award provided to the player would be different. Therefore the present alternative embodiment provides excitement and enjoyment for players because the player does not know the value of the award that would be provided to the player in a play of the game until the symbol indicator 502 stops moving and indicates one of the sections 512.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a cabinet;

a housing connected to the cabinet;

a symbol display connected to said housing, said symbol display including a plurality of reels, each of the reels including a plurality of first symbols;

a symbol indicator movably connected to said housing, said symbol indicator including a plurality of sections, at least one of said sections including a viewable area, wherein the symbol indicator is positionable in a first position to enable a player to view through said viewable area a first quantity of the reels, said first quantity being at least one, and wherein the symbol indicator is positionable in a second different position to enable the player to view through said viewable area a second quantity of the reels, said second quantity being greater than said first quantity;

a processor; and a memory device which stores a plurality of instructions, which when executed by the processor, cause the processor to, after an occurrence of a triggering event:

(i) cause the symbol display to display a plurality of the first symbols on the reels, (ii) cause a movement of the symbol indicator, (iii) if, after said movement of the symbol indicator, the symbol indicator is positioned in the first position, determine any award to be provided to the player based on the first symbols displayed on the first quantity of the reels visible through the viewable area, (iv) if, after said movement of the symbol indicator, the symbol indicator is positioned in the second position, determine any award to be provided to the player based on the first symbols displayed on the second quantity of the reels visible through the viewable area, and (v) provide any determined award to the player.

2. The gaming device of claim 1, which includes a section indicator connected to the housing and positioned adjacent to the symbol indicator to indicate one of the sections of the symbol indicator.

3. The gaming device of claim 2, wherein at least one of said sections includes a second symbol, and wherein the award to be provided to the player is determined based on said second symbol if the section indicator indicates the section including said second symbol.

4. The gaming device of claim 2, wherein a plurality of said sections include second symbols, and wherein the award to be provided to the player is determined based on one of said second symbols if the section indicator indicates the section including said second symbol.

5. The gaming device of claim 2, wherein each of said sections, except the section including the viewable area, includes one of a plurality of second symbols, wherein the award to be provided to the player is determined based on the second symbol of one of said sections if the section indicator indicates said section.

6. The gaming device of claim 1, wherein at least two of the first symbols are different.

7. The gaming device of claim 1, which includes a payline associated with the symbol display.

8. The gaming device of claim 7, wherein the award to be provided to the player is determined based on at least one of the first symbols occurring on the payline when the symbol indicator is positioned to display at least one of the reels.

9. The gaming device of claim 1, which includes a plurality of paylines associated with the symbol display.

10. The gaming device of claim 9, wherein the award to be provided to the player is determined based on at least one of the first symbols occurring on at least one of the paylines when the symbol indicator is positioned to display at least one of the reels.

11. The gaming device of claim 1, wherein the section including the viewable area includes a substantially transparent material.

12. The gaming device of claim 1, wherein at least one of the first symbols is numeric.

13. The gaming device of claim 1, wherein at least one of the first symbols is non-numeric.

14. The gaming device of claim 1, wherein the symbol indicator is at least partially spherical.

15. The gaming device of claim 1, wherein the viewable area is sized to display all of the reels.

16. A gaming device comprising:

a cabinet;

a housing connected to the cabinet;

a symbol display connected to said housing, said symbol display including a plurality of reels, each of the reels including a plurality of first symbols;

a symbol indicator movably connected to said housing, said symbol indicator including a plurality of sections, one of said sections including a first viewable area and one of the other of said sections including a second viewable area, wherein the first viewable area is smaller than the second viewable area, wherein the symbol indicator is positionable to enable a player to view a first quantity of the reels through the first viewable area, wherein the symbol indicator is positionable to enable a player to view a second quantity of the reels through the second viewable area, wherein the second quantity is greater than the first quantity;

a processor; and a memory device which stores a plurality of instructions, which when executed by the processor, cause the processor to, after an occurrence of a triggering event:

(i) cause the symbol display to display a plurality of the first symbols on the reels, (ii) cause a movement of the symbol indicator, (iii) if, after said movement of the symbol indicator, the symbol indicator is positioned to display the section including said first viewable area, determine any award to be provided to the player based on any first symbols displayed on the first quantity of the reels visible through the first viewable area, (iv) if, after said movement of the symbol indicator, the symbol indicator is positioned to display the section including said second viewable area, determine any award to be provided to the player based on any first symbols displayed on the second quantity of the reels visible through the second viewable area, and (v) cause any determined award to be provided the player.

17. The gaming device of claim 16, which includes a section indicator connected to the housing and positioned adjacent to the symbol indicator to indicate one of the sections of the symbol indicator.

18. The gaming device of claim 17, wherein at least one of said sections includes a second symbol, and wherein the award to be provided to the player is determined based on said second symbol if the section indicator indicates the section including said second symbol.

19. The gaming device of claim 17, wherein a plurality of said sections include second symbols, and wherein the award to be provided to the player is determined based on one of said second symbols if the section indicator indicates one of the sections including one of said second symbols.

20. The gaming device of claim 17, wherein each of said sections, except the sections including the viewable areas, includes one of a plurality of second symbols, and wherein the award to be provided to the player is determined based on the second symbol of said section if the section indicator indicates one of said sections.

21. The gaming device of claim 16, wherein at least two of the first symbols are different.

22. The gaming device of claim 16, which includes a payline associated with the symbol display.

23. The gaming device of claim 22, wherein the award to be provided to the player is determined based on at least one of the first symbols occurring on the payline when the symbol indicator is positioned to display one of the sections including one of the viewable areas.

24. The gaming device of claim 16, which includes a plurality of paylines associated with the symbol display.

25. The gaming device of claim 24, wherein the award to be provided to the player is determined based on at least one of the first symbols occurring on at least one of the paylines when the symbol indicator is positioned to display one of the sections including one of the viewable areas.

26. The gaming device of claim 16, wherein at least one of the first symbols is numeric.

27. The gaming device of claim 16, wherein at least one of the first symbols is non-numeric.

28. The gaming device of claim 16, wherein the symbol indicator is at least partially spherical.

29. The gaming device of claim 16, wherein at least one of the viewable areas is sized to display all of the reels.

30. A gaming device comprising:

a cabinet;

a housing connected to the cabinet;

a symbol display connected to said housing, said symbol display including a plurality of reels, each of the reels including a plurality of first symbols;

a symbol indicator movably connected to said housing, said symbol indicator including a plurality of sections, at least two of said sections including viewable areas and at least one of said sections including a modifier, wherein:

the symbol indicator is positionable in a first position to indicate one of the sections including one of the viewable areas and enable a player to view, through said one of the viewable areas, a first quantity of the reels, wherein said first quantity is at least one, the symbol indicator is positionable in a second different position to enable the player to view, through said one of the viewable areas, a second quantity of the reels, wherein said second quantity is greater than said first quantity, and the symbol indicator is positionable in a third different position to indicate the section including the modifier;

a processor; and a memory device which stores a plurality of instructions, which when executed by the processor, cause the processor to, after an occurrence of a triggering event:

(a) cause the symbol display to display a plurality of the first symbols on the reels, (b) cause a movement of the symbol indicator, (c) determine any award to be provided to the player, wherein:

(i) if the symbol indicator indicates one of the sections including one of said viewable areas and the symbol indicator is in the first position, the award is determined based on the first symbols displayed on the first quantity of the reels visible through said one of the viewable areas, (ii) if the symbol indicator indicates one of the sections including one of said viewable areas and the symbol indicator is in the second position, the award is determined based on the first symbols displayed on the second quantity of the reels visible through said one of the viewable areas, and (iii) if the symbol indicator indicates the section including the modifier, the award is determined based on the first symbols on the reels visible through the viewable areas and the modifier; and (d) cause any determined award to be provided the player.

31. The gaming device of claim 30, which includes a section indicator connected to the housing and positioned adjacent to the symbol indicator to indicate one of the sections of the symbol indicator.

32. The gaming device of claim 31, wherein at least one of said sections includes a second symbol, and wherein the award to be provided to the player is determined based on said second symbol if the symbol indicator indicates one of said sections including said second symbol.

33. The gaming device of claim 31, wherein a plurality of said sections each include a second symbol, and wherein the award to be provided to the player is determined based on one of said second symbols if the symbol indicator indicates one of said sections including the second symbol.

34. The gaming device of claim 31, wherein each of said sections includes a second symbol, and wherein the award to be provided to the player is determined based on said second symbol if the symbol indicator indicates one of said sections including the second symbol.

35. The gaming device of claim 30, wherein at least two of the first symbols are different.

36. The gaming device of claim 30, which includes a payline associated with the symbol display.

37. The gaming device of claim 36, wherein the award to be provided to the player is determined based on at least one of the first symbols occurring on the payline when the symbol indicator indicates one of the sections including one of the viewable areas.

38. The gaming device of claim 30, which includes a plurality of paylines associated with the symbol display.

39. The gaming device of claim 38, wherein the award to be provided to the player is determined based on at least one of the first symbols occurring on at least one of the paylines when the symbol indicator indicates one of the sections including one of the viewable areas.

40. The gaming device of claim 30, wherein each of the sections including the viewable areas includes a substantially transparent material.

41. The gaming device of claim 30, wherein at least one of the first symbols is numeric.

42. The gaming device of claim 30, wherein at least one of the first symbols is non-numeric.

43. The gaming device of claim 30, wherein the symbol indicator is at least partially spherical.

44. A method for operating a gaming device, said method comprising:

(a) causing a symbol display including a plurality of reels to display a plurality of first symbols on the reels after a triggering event in a game;

(b) causing a movement of a symbol indicator relative to said symbol display, wherein the symbol indicator includes a plurality of sections, at least one of the sections including a viewable area, wherein the symbol indicator is positionable in a first position to enable a player to view, through the viewable area, a first quantity of the reels, the first quantity being at least one, and wherein the symbol indicator is positionable in a second different position to enable the player to view, through the viewable area, a second quantity of the reels, the second quantity being greater than the first quantity;

(c) if, after said movement of the symbol indicator, the symbol indicator is positioned in the first position, determining any award to be provided to the player based on the first symbols displayed on the first quantity of the reels visible through the viewable area;

(d) if, after said movement of the symbol indicator, the symbol indicator is positioned in the second position, determining any award to be provided to the player based on the first symbols displayed on the second quantity of the reels visible through the viewable area; and (e) causing any determined award to be provided to the player.

45. The method of claim 44, which includes displaying at least one second symbol on one of the sections, wherein the award to be provided to the player is determined based on said second symbol when the symbol indicator indicates said one of the sections including said second symbol.

46. The method of claim 44, which includes displaying a plurality of second symbols on the sections, wherein the award to be provided to the player is determined based on one of said second symbols when the symbol indicator indicates one of the sections including said second symbol.

47. The method of claim 44, which includes displaying a second symbol on each of the sections, wherein the award to be provided to the player is determined based on said second symbol when the symbol indicator indicates one of the sections including said second symbol.

48. The method of claim 44, which includes associating a payline with the symbol display.

49. The method of claim 48, wherein determining the award to be provided to the player includes determining the award based on at least one of the first symbols occurring on the payline when the symbol indicator indicates the section including the viewable area.

50. The method of claim 44, which includes associating a plurality of paylines with the symbol display.

51. The method of claim 50, wherein determining the award to be provided to the player includes determining the award based on at least one of the first symbols occurring on at least one of the paylines when the symbol indicator indicates the section including the viewable area.

52. The method of claim 44, wherein determining the award to be provided to the player includes determining a sum of the first symbols on the reels visible through the viewable area when the symbol indicator indicates the section including said viewable area.

53. The method of claim 44, wherein determining the award to be provided to the player includes determining a product of the first symbols on the reels visible through the viewable area when the symbol indicator indicates the section including said viewable area.

54. The method of claim 44, which includes indicating at least one of the sections using a section indicator positioned adjacent to the symbol indicator.

55. The method of claim 44, which includes sizing the viewable area to display all of the reels.

56. The method of claim 44, which includes operating the gaming device through a data network.

57. The method of claim 56, wherein the data network is an internet.

58. A method for operating a gaming device, said method comprising:

(a) moving a symbol indicator relative to a symbol display, said symbol display including a plurality of reels, each of the reels including a plurality of first symbols, wherein the symbol indicator includes a plurality of sections, at least one of the sections including a viewable area, wherein the symbol indicator is positionable in different positions to enable a player to view through the viewable area:

(i) a first quantity of the reels when the symbol indicator is in a first position, wherein the first quantity is at least one; and (ii) a second quantity of the reels when the symbol indicator is in a second different position, wherein the second quantity is greater than the first quantity;

(b) causing the symbol display to display a plurality of the first symbols on the reels after a triggering event associated with a game;

(c) when the symbol indicator indicates the section including said viewable area and the symbol indicator is in the first position, determining an award to be provided to the player based on the first symbols displayed on the first quantity of the reels visible through the viewable area;

(d) when the symbol indicator indicates the section including said viewable area and the symbol indicator is in the second position, determining an award to be provided to the player based on the second quantity of the reels visible through the viewable area;

and (e) providing any determined award to the player.

59. The method of claim 58, which includes displaying at least one second symbol on one of the sections, wherein the award is determined based on said second symbol when the symbol indicator indicates said one of the sections including said second symbol.

60. The method of claim 58, which includes displaying a plurality of second symbols on the sections, wherein the award is determined based on one of said second symbols when the symbol indicator indicates one of the sections including said second symbol.

61. The method of claim 58, which includes displaying a second symbol on each of the sections, wherein the award is determined based on said second symbol when the symbol indicator indicates one of the sections including said second symbol.

62. The method of claim 58, which includes associating a payline with the symbol display.

63. The method of claim 62, wherein determining the award to be provided to the player includes determining the award based on at least one of the first symbols occurring on the payline when the symbol indicator indicates the section including the viewable area.

64. The method of claim 58, which includes associating a plurality of paylines with the symbol display.

65. The method of claim 64, wherein determining the award to be provided to the player includes determining the award based on at least one of the first symbols occurring on at least one of the paylines when the symbol indicator indicates the section including the viewable area.

66. The method of claim 58, wherein determining the award to be provided to the player includes determining a sum of the first symbols on the first quantity or the second quantity of the reels visible through the viewable area when the symbol indicator indicates the section including said viewable area.

67. The method of claim 58, wherein determining the award to be provided to the player includes determining a product of the first symbols on the first quantity or the second quantity of the reels visible through the viewable area when the symbol indicator indicates the section including said viewable area.

68. The method of claim 58, which includes sizing the viewable area to display all of the reels.

69. The method of claim 58, which includes operating the gaming device through a data network.

70. The method of claim 69, wherein the data network is an internet.

71. A method for operating a gaming device, said method comprising:

(a) after a triggering event associated with a game, displaying at least one first symbol of a plurality of first symbols on a symbol display to a player, said symbol display including a plurality of reels, each of the reels including a plurality of first symbols;

(b) moving a symbol indicator relative to said symbol display, wherein the symbol indicator includes a plurality of sections, at least two of said sections including viewable areas and at least one of said sections including a function symbol, wherein the symbol indicator is positionable in different positions to enable the player to view through at least one of the viewable areas:

(i) a first quantity of the reels when the symbol indicator is in a first position, wherein the first quantity is at least one, and (ii) a second quantity of the reels when the symbol indicator is in a second different position, wherein the second quantity is greater than the first quantity;

(c) when the symbol indicator indicates one of the sections including one of said viewable areas, determining an award to be provided to the player, wherein:

(i) if said symbol indicator is in the first position, the award is determined based on the first symbols displayed on the first quantity of the reels visible through said one of the viewable areas, and (ii) if said symbol indicator is in the second position, the award is determined based on the first symbols displayed on the second quantity of the reels visible through said one of the viewable areas;

(d) when the symbol indicator indicates the section including the function symbol, determining an award to be provided to the player based on the first symbols visible through the viewable areas and the function symbol; and (e) causing any determined award to be provided to the player.

72. The method of claim 71, which includes displaying at least one second symbol on one of the sections, wherein the award to be provided to the player is determined based on said second symbol when the symbol indicator indicates said one of the sections including said second symbol.

73. The method of claim 71, which includes displaying a plurality of second symbols on the sections, wherein the award to be provided to the player is determined based on one of said second symbols when the symbol indicator indicates one of the sections including said second symbol.

74. The method of claim 71, which includes displaying a second symbol on each of the sections, wherein the award to be provided to the player is determined based on said second symbol when the symbol indicator indicates one of the sections including said second symbol.

75. The method of claim 71, which includes associating a payline with the symbol display.

76. The method of claim 75, wherein determining the award to be provided to the player includes determining the award based on at least one of the first symbols occurring on the payline when the symbol indicator indicates one of the sections including one of the viewable areas.

77. The method of claim 71, which includes associating a plurality of paylines with the symbol display.

78. The method of claim 77, wherein determining the award to be provided to the player includes determining the award based on at least one of the first symbols occurring on at least one of the paylines when the symbol indicator indicates one of the sections including one of the viewable areas.

79. The method of claim 71, wherein, when the symbol indicator indicates one of the sections including one of the viewable areas, determining the award to be provided to the player includes determining a sum of the first symbols on the reels visible through said one of the viewable areas.

80. The method of claim 71, wherein, when the symbol indicator indicates the section including one of said viewable areas, determining the award to be provided to the player includes determining a product of the first symbols on the reels visible through said one of the viewable areas.

81. The method of claim 71, wherein determining the award to be provided to the player includes determining a product of the first symbols on the reels viewable through the viewable areas when the section including the function symbol is indicated by the symbol display, and wherein the function symbol is a multiplier symbol.

82. The method of claim 71, wherein determining the award to be provided to the player includes determining a sum of the first symbols on the reels viewable through the viewable areas when the section including the function symbol is indicated by the symbol display, and wherein the function symbol is an addition symbol.

83. The method of claim 71, wherein determining the award to be provided to the player includes determining a difference of the first symbols on the reels viewable through the viewable areas when the section including the function symbol is indicated by the symbol display, and wherein, the function symbol is a subtraction symbol.

84. The method of claim 71, which includes operating the gaming device through a data network.

85. The method of claim 84, wherein the data network is an internet.

86. A gaming device comprising:
- a cabinet;
- a housing connected to the cabinet;
- a symbol display connected to said housing, said symbol display including a plurality of reels, each of the reels including a plurality of first symbols;
- a symbol indicator movably connected to said housing, said symbol indicator including a plurality of sections, at least one of said sections including a plurality of viewable areas, wherein the symbol indicator is positionable to enable a player to view through each of the viewable areas:
  - (i) a first quantity of the reels, or
  - (ii) a second quantity of the reels, wherein the second quantity is greater than the first quantity,
- a processor; and
- a memory device which stores a plurality of instructions, which when executed by the processor, cause the processor to, after an occurrence of a triggering event:
  - (i) cause the symbol display to display a plurality of the first symbols on the reels,
  - (ii) cause a movement of the symbol indicator,
  - (iii) determine an award to be provided to the player, wherein:
    - (A) if the section indicator indicates the section including the plurality of viewable areas and the section indicator is positioned such that the first quantity of the reels is visible through each of the viewable areas, the award is determined based on the first symbols displayed on the first quantity of the reels visible through the viewable areas, and
    - (B) if the section indicator indicates the section including the plurality of viewable areas and the section indicator is positioned such that the second quantity of the reels is visible through each of the viewable areas, determine an award to be provided to the player based on first symbols displayed on the second quantity of the reels visible through the viewable areas, and
  - (iv) cause any determined award to be provided to the player.

87. The gaming device of claim 86, wherein the section including the plurality of viewable areas includes at least one modifier.

88. The gaming device of claim 86, which includes a section indicator connected to the housing and positioned adjacent to the symbol indicator to indicate one of the sections of the symbol indicator.

89. The gaming device of claim 88, wherein at least one of said sections includes a second symbol, and wherein the award to be provided to the player is determined based on said second symbol if the section indicator indicates one of the sections including said second symbol.

90. The gaming device of claim 88, wherein a plurality of said sections include second symbols, and wherein the award to be provided to the player is determined based on one of said second symbols if the section indicator indicates one of the sections including one of said second symbols.

91. The gaming device of claim 88, wherein each of said sections, except the section including the viewable areas, includes one of a plurality of second symbols, and wherein, if the section indicator indicates one of said sections including one of the second symbols, the award to be provided to the player is determined based on the second symbol of said section.

92. The gaming device of claim 86, wherein at least two of the first symbols are different.

93. The gaming device of claim 86, which includes a payline associated with the symbol display.

94. The gaming device of claim 93, wherein the award to be provided to the player is determined based on at least one of the first symbols occurring on the payline when the symbol indicator is positioned to display the section including the viewable areas.

95. The gaming device of claim 86, which includes a plurality of paylines associated with the symbol display.

96. The gaming device of claim 95, wherein the award to be provided to the player is determined based on at least one of the first symbols occurring on at least one of the paylines when the symbol indicator is positioned to display the section including the viewable areas.

97. The gaming device of claim 86, wherein at least one of the first symbols is numeric.

98. The gaming device of claim 86, wherein at least one of the first symbols is non-numeric.

99. The gaming device of claim 94, wherein the symbol display is at least partially spherical.

100. The gaming device of claim 86, wherein the viewable areas are sized to display all of the reels.

101. The gaming device of claim 86, wherein the first quantity of reels is greater than one.

102. A method for operating a gaming device, said method comprising:

(a) moving a symbol indicator relative to a symbol display, said symbol display including a plurality of reels, each of the reels including a plurality of first symbols, wherein the symbol indicator includes a plurality of sections, at least one of the sections including a plurality of viewable areas, wherein the symbol indicator is positionable to enable a player to view through each of the viewable areas:

(i) a first quantity of the reels, or (ii) a second quantity of the reels, wherein the second quantity is greater than the first quantity;

(b) after a triggering event associated with a game, if the symbol indicator indicates the sections including the plurality of viewable areas, causing the symbol display to display a plurality of the first symbols on the reels visible through each of the viewable areas of said section;

(c) if the symbol indicator indicates the section including said plurality of viewable areas and the first quantity of the reels is visible through each of said viewable areas, determining an award to be provided to the player based on the first symbols displayed on the first quantity of the reels, (d) if the symbol indicator indicates the section including said plurality of viewable areas and the second quantity of the reels is visible through each of said viewable areas, determining the award to be provided to the player based on the first symbols displayed on the second quantity of the reels; and (e) providing any determined award to the player.

103. The method of claim 102, which includes associating a section indicator with the symbol indicator to indicate one of the sections of the symbol indicator.

104. The method of claim 102, which includes associating at least one modifier with the viewable areas.

105. The method of claim 104, which includes determining the award to be provided to the player based on a product of the first symbols displayed on each of the reels visible through the viewable areas when the modifier is a multiplier.

106. The method of claim 104, which includes determining the award to be provided to the player based on a sum of the first symbols displayed on each of the reels visible through the viewable areas when the modifier is an addition symbol.

107. The method of claim 102, wherein the first quantity of the reels is greater than one.

108. The method of claim 102, which includes operating the gaming device through a data network.

109. The method of claim 108, wherein the data network is an internet.

* * * * *